United States Patent
Redfern et al.

(10) Patent No.: US 9,710,543 B2
(45) Date of Patent: Jul. 18, 2017

(54) AUTOMATED SUBSTITUTION OF TERMS BY COMPOUND EXPRESSIONS DURING INDEXING OF INFORMATION FOR COMPUTERIZED SEARCH

(75) Inventors: Darren Redfern, Stratford (CA); Chad Ternent, Kitchener (CA)

(73) Assignee: IntelliResponse Systems Inc., Toronto (CA)

( * ) Notice: Subject to any disclaimer, the term of this patent is extended or adjusted under 35 U.S.C. 154(b) by 547 days.

(21) Appl. No.: 13/569,644

(22) Filed: Aug. 8, 2012

(65) Prior Publication Data

US 2014/0046951 A1    Feb. 13, 2014

(51) Int. Cl.
  *G06F 7/00*    (2006.01)
  *G06F 17/30*   (2006.01)
(52) U.S. Cl.
  CPC ............................ *G06F 17/30672* (2013.01)
(58) Field of Classification Search
  None
  See application file for complete search history.

(56) References Cited

U.S. PATENT DOCUMENTS

| | | | |
|---|---|---|---|
| 6,571,239 B1 * | 5/2003 | Cole et al. | |
| 7,171,409 B2 | 1/2007 | Craig et al. | |
| 7,752,220 B2 * | 7/2010 | Weyand | G06F 17/30657 707/719 |
| 7,792,851 B2 * | 9/2010 | Berg | G06F 17/30286 707/722 |
| 7,882,124 B2 * | 2/2011 | Slaney | G06F 17/30268 707/765 |
| 7,890,516 B2 * | 2/2011 | Zarzar Charur | G06F 17/3064 707/706 |
| 8,037,086 B1 * | 10/2011 | Upstill | G06F 17/2795 704/10 |
| 8,290,936 B2 * | 10/2012 | Day | G06F 17/30463 707/714 |
| 8,332,389 B2 * | 12/2012 | Bestgen | G06F 17/30466 707/714 |
| 2003/0097357 A1 * | 5/2003 | Ferrari et al. | 707/3 |
| 2003/0145001 A1 * | 7/2003 | Craig et al. | 707/5 |
| 2005/0267871 A1 * | 12/2005 | Marchisio et al. | 707/3 |
| 2007/0106659 A1 * | 5/2007 | Lu et al. | 707/5 |
| 2007/0156677 A1 * | 7/2007 | Szabo | 707/5 |

(Continued)

*Primary Examiner* — Hexing Liu

(57) ABSTRACT

Methods, software and devices for indexing responses for later providing to users in response to queries are disclosed. For each stored response, representative queries are stored in association with that response, where each representative query represents a possible query for searching for information addressed by that response. Representative queries are selectively modified by substituting terms by corresponding chosen substitute expressions, where a substitute expression is chosen for a particular term in one of the representative queries based on past substitutions in others of said representative queries. For each response, a Boolean expression is formed from those representative queries associated with that response, as selectively modified, where the Boolean expression is satisfied by each of those representative queries. The Boolean expression is stored in association with that response for later applying to each query, that response to be provided to the user in response of those queries satisfying the Boolean expression.

16 Claims, 16 Drawing Sheets

(56) References Cited

U.S. PATENT DOCUMENTS

| | | | |
|---|---|---|---|
| 2010/0223275 A1* | 9/2010 | Foulger et al. | 707/767 |
| 2010/0325133 A1* | 12/2010 | Rounthwaite | G06F 17/30864 707/759 |
| 2011/0035403 A1* | 2/2011 | Ismalon | G06F 17/3064 707/769 |
| 2011/0060756 A1* | 3/2011 | Schoenbach | G06F 17/3002 707/769 |
| 2011/0066620 A1* | 3/2011 | Redfern et al. | 707/741 |
| 2011/0106617 A1* | 5/2011 | Cooper | G06Q 30/02 705/14.49 |
| 2011/0258212 A1* | 10/2011 | Lu | G06F 17/30864 707/760 |
| 2012/0166468 A1* | 6/2012 | Gupta | G06F 17/3087 707/768 |
| 2012/0191745 A1* | 7/2012 | Velipasaoglu | G06F 17/3064 707/767 |
| 2012/0296926 A1* | 11/2012 | Kalin | G06F 17/3097 707/765 |
| 2013/0124500 A1* | 5/2013 | Beavin et al. | 707/714 |

\* cited by examiner

AUTOMATED SUBSTITUTION OF TERMS BY COMPOUND EXPRESSIONS DURING INDEXING OF INFORMATION FOR COMPUTERIZED SEARCH

FIELD OF THE INVENTION

The present invention relates to the indexing of information, and more particularly to a method, software and device for automatically substituting terms by compound expressions when indexing information for computerized search, and for searching and retrieving indexed information using a computer.

BACKGROUND OF THE INVENTION

U.S. Pat. No. 7,171,409, the contents of which are hereby incorporated by reference, discloses an information search and indexing method in which information is organized as a plurality of responses to possible queries. The collection of responses may be thought of as an information base. For each response in the information base, a Boolean expression that may be applied to possible queries searching for that response is formulated and stored in association with that response. When a query is received, stored Boolean expressions for the multiple responses in the information base are applied to the query. Responses associated with the expressions that are wholly or partially satisfied by the query may be presented to an information seeker.

U.S. application Ser. No. 12/558,001 (published as U.S. Publication No. 2011/0066620), the contents of which are hereby incorporated by reference, discloses a method of automatically formulating Boolean expressions for responses from representative queries entered by operators for each of those responses, where each representative query represent a possible text query (e.g., a natural language query) from an end-user searching for information addressed by that response. Responses are thus indexed using these manually entered representative queries and automatically formulated Boolean expressions. Indexed responses may then be searched and retrieved in response to user queries.

However, while Boolean expressions may be automatically formulated from representative queries, indexing still largely relies on an operator to manually craft the representative queries for each response. In particular, formulating Boolean expressions tolerant to variations in text queries from information seekers, e.g., variations arising from the use of synonymous query terms, requires an operator to craft the representative queries in anticipation of those variations. As will be appreciated, the task of preparing and tailoring representative queries in anticipation of myriad variations in the text queries requires both an exercise of skill and judgment by an operator as well as an investment of time. Moreover, this challenge is faced each time that new responses and/or representative queries are added to an information base.

Accordingly, there remains a need for improved methods, software, and devices for preparing representative queries during indexing of responses in an information base.

SUMMARY OF THE INVENTION

In accordance with an aspect of the present invention there is provided a computer-implemented method of indexing a plurality of responses for later providing to users in response to queries. The method comprises: storing the plurality of responses; for each of the responses, storing a plurality of representative queries in association with that response, each of the representative queries representing a possible query for searching for information addressed by that response; selectively modifying the representative queries by substituting terms of the representative queries by corresponding substitute expressions chosen from a plurality of substitute expression, where a substitute expression is chosen for a particular term in one of the representative queries based on past substitutions in others of the representative queries; for each of the plurality of responses: forming a Boolean expression from those representative queries, as selectively modified, of the plurality of representative queries associated with that response, the Boolean expression satisfied by each of those representative queries; and storing the Boolean expression in association with that response for later applying to each of the queries, and that response to be provided to the user in response of those of the queries satisfying the Boolean expression.

In accordance with another aspect of the present invention there is provided a computer readable medium storing computer executable instructions that, when executed at a computing device, cause the computing device to index a plurality of responses for later providing to users in response to queries, using a method comprising: storing the plurality of responses; for each of the responses, storing a plurality of representative queries in association with that response, each of the representative queries representing a possible query for searching for information addressed by that response; selectively modifying the representative queries by substituting terms of the representative queries by corresponding substitute expressions chosen from a plurality of substitute expression, where a substitute expression is chosen for a particular term in one of the representative queries based on past substitutions in others of the representative queries; for each of the plurality of responses: forming a Boolean expression from those representative queries, as selectively modified, of the plurality of representative queries associated with that response, the Boolean expression satisfied by each of those representative queries; and storing the Boolean expression in association with that response for later applying to each of the queries, and that response to be provided to the user in response of those of said queries satisfying said Boolean expression.

In accordance with yet a further aspect of the present invention there is provided a computing device for indexing a plurality of responses for later providing to users in response to queries. The computing device comprises at least one processor; memory in communication with the at least one processor; and software code stored in the memory. The software code, when executed by the at least one processor causes the computing device to: store the plurality of responses; for each of the responses, store a plurality of representative queries in association with that response, each of the representative queries representing a possible query for searching for information addressed by that response; selectively modify the representative queries by substituting terms of the representative queries by corresponding substitute expressions chosen from a plurality of substitute expression, where a substitute expression is chosen for a particular term in one of the representative queries based on past substitutions in others of the representative queries; for each of the plurality of responses: form a Boolean expression from those representative queries, as selectively modified, of the plurality of representative queries associated with that response, the Boolean expression satisfied by each of those representative queries; and store the Boolean expression in association with that response for later applying to each of the queries, and that response to be provided to the user in response of those of the queries satisfying the Boolean expression.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures, which illustrate by way of example only, embodiments of this invention.

DETAILED DESCRIPTION

Figure 1:
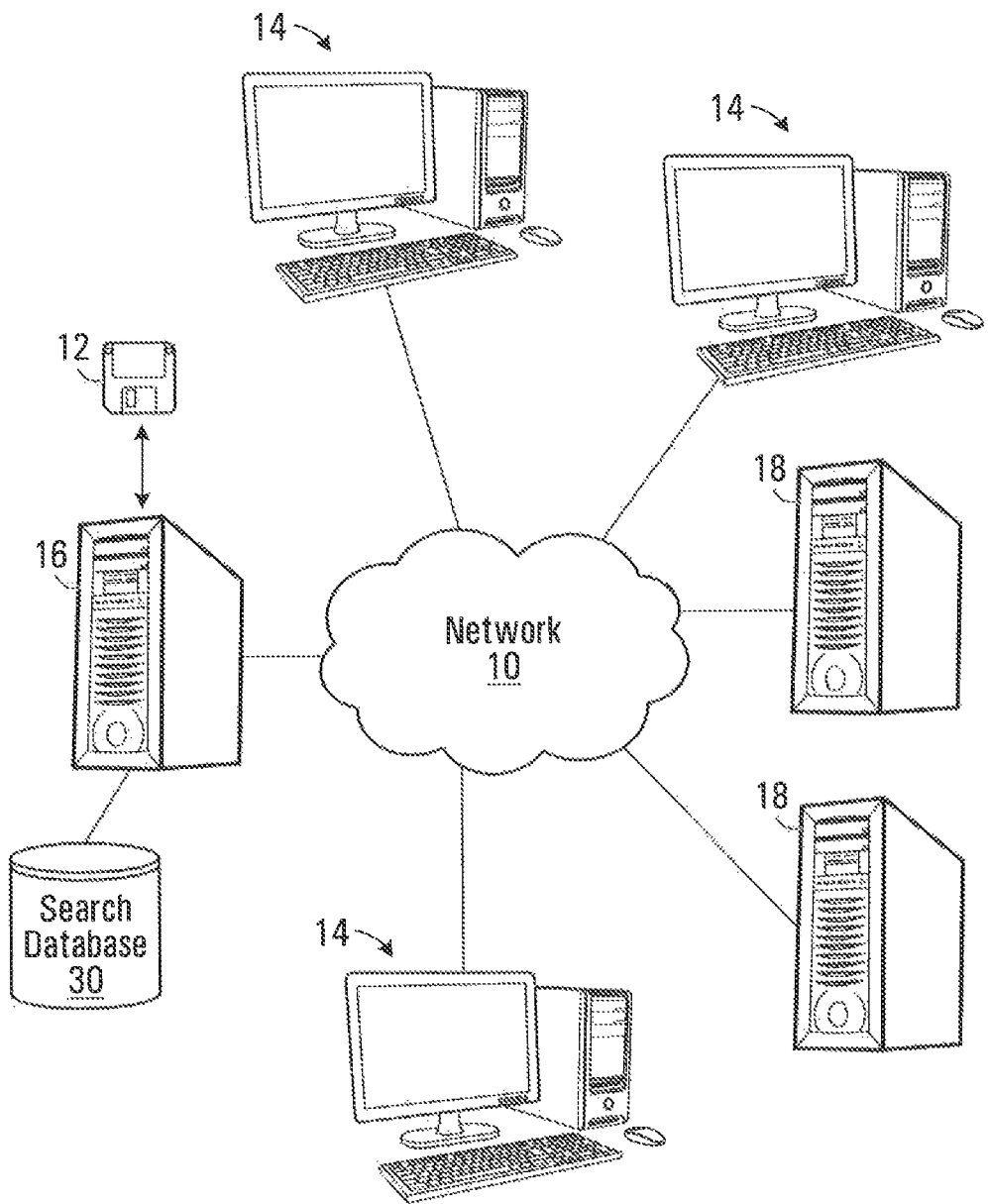
FIG. 1 illustrates a computer network and network interconnected server, operable to index information and provide search results, exemplary of an embodiment of the present invention.

FIG. 1 illustrates a computer network interconnected server 16. Server 16 may be a conventional network server, that is configured and operated to index information and search and retrieve indexed information, largely as described in the '409 patent and in the '001 application, and in manners exemplary of embodiments of the present invention as detailed herein.

As illustrated, server 16 is in communication with a computer network 10 in communication with other computing devices such as end-user computing devices 14 and computer servers 18. Network 10 may be a packet-switched data network coupled to server 16. So, network 10 could, for example, be an IPv4, IPv6, X.25, IPX compliant or similar network. Network 10 may include wired and wireless points of access, including wireless access points, and bridges to other communications networks, such as GSM/GPRS/3G/LTE or similar wireless networks.

Example end-user computing devices 14 are illustrated. Servers 18 are also illustrated. As will become apparent, end-user computing devices 14 are conventional network-interconnected computers used to access data from network interconnected servers, such as servers 18 and server 16.

Example server 16 preferably includes a network interface physically connecting server 16 to computer network 10, and a processor coupled to conventional computer memory. The processor may be an Intel x86, PowerPC, ARM processor or the like. Example server 16 may further include input and output peripherals such as a keyboard, display and mouse. As well, server 16 may include a peripheral usable to load software exemplary of embodiments of the present invention into its memory for execution from a software readable medium, such as medium 12.

As such, server 16 includes a conventional filesystem, typically controlled and administered by the operating system governing overall operation of server 16. This filesystem may host an information base in database 30, and search software and indexing software exemplary of embodiments of the present invention, as detailed below. In the illustrated embodiment, server 16 also includes hypertext transfer protocol ("HTTP") files, to provide end-users an interface to search data within database 30. Server 16 thus stores index information for the information base and provides search results to requesting computing devices, such as devices 14.

Figure 2:
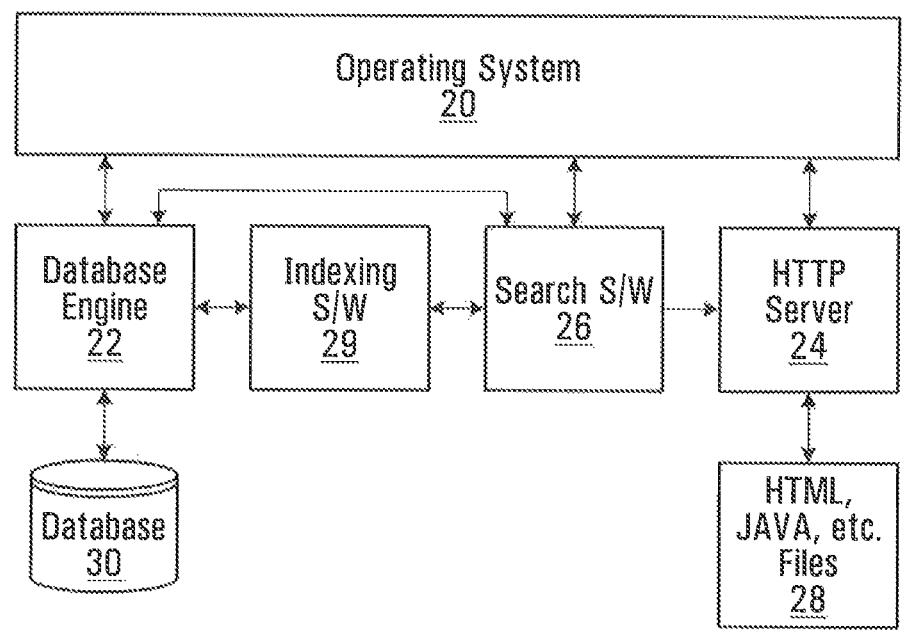
FIG. 2 is a functional block diagram of software stored and executing at the network server of FIG. 1.

FIG. 2 illustrates a functional block diagram of software components preferably implemented at server 16. As will be appreciated, software components embodying such functional blocks may be loaded from medium 12 (FIG. 1) and stored within persistent memory at server 16. As illustrated, software components preferably include operating system software 20, a database engine 22, an HTTP server application 24, search software 26, and indexing software 29, exemplary of embodiments of the present invention. Further, database 30 is again illustrated. Again database 30 is preferably stored within memory at server 16. As well, data files 28 used by search software 26 and HTTP server application 24 are illustrated.

Operating system software 20 may, for example, be Linux, Unix, FreeBSD, Solaris, OS X, Windows (NT, XP, 7), or the like. Operating system software 20 preferably also includes a TCP/IP stack, allowing communication of server 16 with data network 10. Database engine 22 may be a conventional relational or object-oriented database engine, such as Microsoft SQL Server, Oracle, DB2, Sybase, Pervasive or any other database engine known to those of ordinary skill in the art. Database engine 22 thus typically includes an interface for interaction with operating system software 20, and other application software, such as search software 26 and indexing software 29. Ultimately, database engine 22 is used to add, delete and modify records at database 30. HTTP server application 24 is preferably an Apache, IIS, nginx or similar server application, also in communication with operating system software 20 and database engine 22. HTTP server application 24 allows server 16 to act as a conventional HTTP server, and thus provide a plurality of web pages for access by network interconnected computing devices, HTTP pages that make up these web pages may be implemented using one of the conventional web page languages such as hypertext mark-up language ("HTML"), Java, Javascript, Flash or the like. These pages may be stored within files 28.

Search software 26 adapts server 16, in combination with database engine 22 and operating system software 20, and HTTP server application 24 to function as described in the '409 patent. Search software 26 may act as an interface between database engine 22 and HTTP server application 24 and may process requests made by interconnected computing devices. In this way, search software 26 may query, and update entries of database 30 in response to requests received over network 10, in response to interaction with presented web pages. Similarly, search software 26 may process the results of user queries, and present results to database 30, or to users by way of HTTP pages. Search software 26 may for example, be suitable CGI or Perl scripts; Java; Microsoft Visual Basic applications, C/C++/C# applications; or similar applications created in conventional ways by those of ordinary skill in the art.

HTTP pages provided to computing devices 14 in communication with server 16 typically provide users at devices 14 access to a search tool and interface for searching information indexed at database 30. The interface may be stored as HTML, Java, Javascript, Flash or similar data in files 28. Conveniently, information seekers may make selections and provide information by clicking on icons and hyperlinks, and by entering data into information fields of the pages, presented at devices 14. As such, HTTP pages are typically designed and programmed by or on behalf of an operator (administrator) of server 16. Conveniently, the HTTP pages may be varied as a server, like server 16, is used by various information or index providers.

Software components at server 16 further include indexing software 29 for indexing information stored in database 30, in manner exemplary of embodiments of the present invention. Information, once indexed by indexing software 29, may then be searched and retrieved by search software 26 in response to user queries. Indexing software 29 may for example, be formed using suitable CGI or Perl scripts; Java; Microsoft Visual Basic application, C/C++/C# applications; or similar applications created in conventional ways by those of ordinary skill in the art. Indexing software 29 may interact with the remaining software components at device 16, including database engine 22, HTTP server 24, and search software 26.

Files 28, search software 26 and indexing software 29 may further define an administrative interface, not specifically detailed herein. The administrative interface may allow an operator to populate database 30, retrieve data representative of user queries, and operate in conjunction with indexing software 29, as detailed below. The administrative interface may be accessed through network 10, by an appropriate computing device using an appropriate network address, operator identifier and password.

End-user computing devices 14 are conventional network-interconnected computing devices used to access data and services through a suitable HTML browser or similar interface from network interconnected servers, such as server 16. Each computing device 14 is typically provided by a user of server 16 and not by the operator of server 16. The architecture of computing devices 14 is not specifically illustrated. Each computing device 14 may include a processor, network interface, display, and memory, and may be a desktop personal computer, a laptop computing device, a network computing device, a tablet computing device, a personal digital assistant, a mobile phone, or the like. Computing devices 14 may access server 16 by way of network 10. As such, computing devices 14 typically store and execute network-aware operating systems including protocol stacks, such as a TCP/IP stack, and web browsers such as Microsoft Internet Explorer, Mozilla Firefox, Google Chrome, Apple Safari, or the like.

As noted, server 16 includes a database 30. Database 30 is preferably a relational database. As will become apparent, database 30 includes records representative of indexed data that may be considered the information base indexed within database 30. Database 30 may further store information used for indexing, as detailed below. Database 30 may further store information representative of searches requested through server 16.

Figure 3:
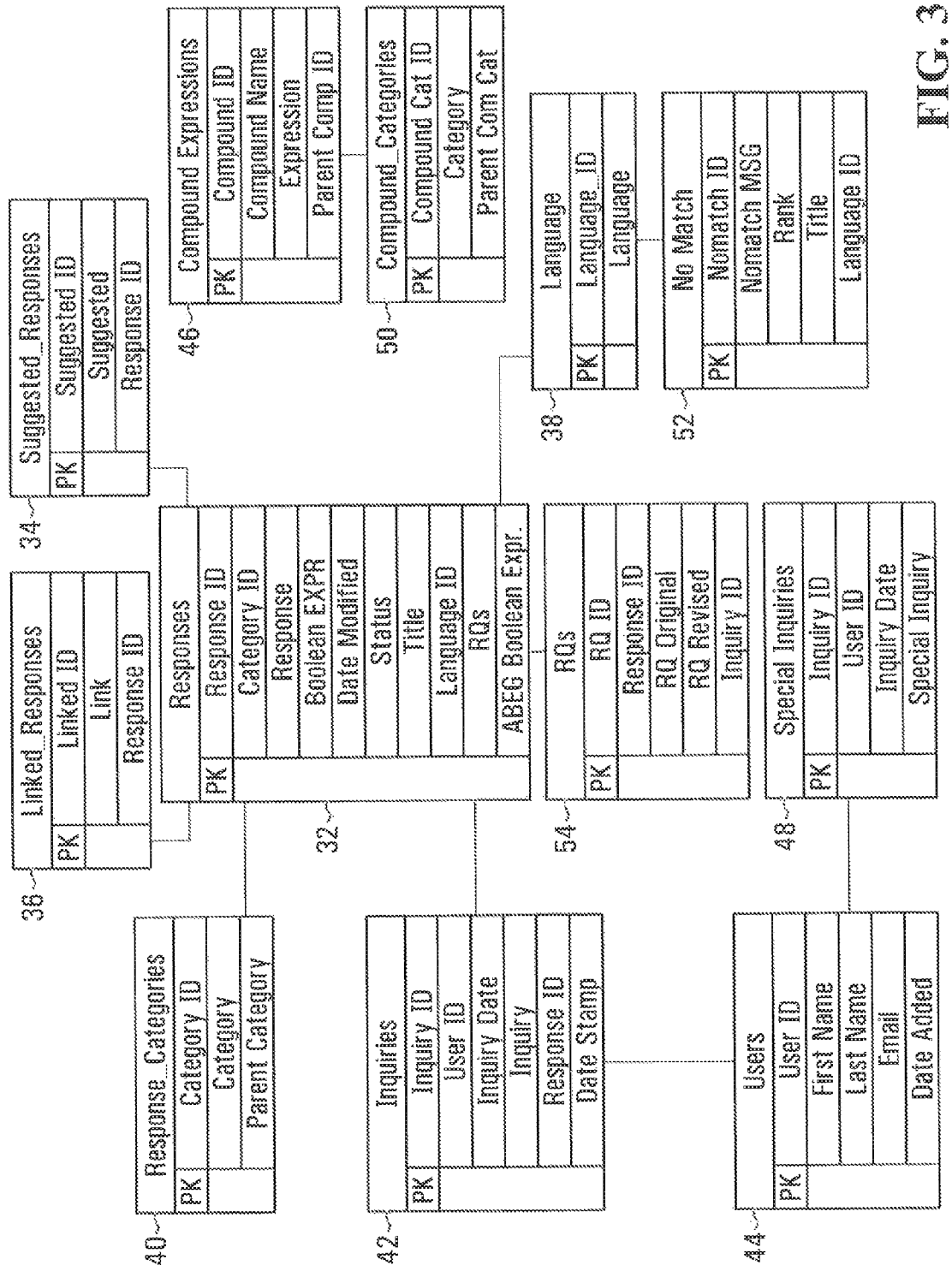
FIG. 3 is a diagram illustrating a database schema for a database used by the network server of FIG. 1.

A simplified example organization of database 30 is illustrated in FIG. 3. As illustrated, example database 30 is organized as a plurality of tables. Specifically, database 30 includes responses table 32 (RESPONSES), suggested responses table 34 (SUGGESTED_RESPONSES); linked responses table 36 (LINKED_RESPONSES); languages table 38 (LANGUAGE); response categories table 40 (RESPONSE_CATEGORIES); inquiries table 42 (INQUIRIES); users table 44 (USERS); compound expressions table 46 (COMPOUND_EXPRESSIONS); special inquiries table 48 (SPECIAL_INQUIRIES); compound categories table 50 (COMPOUND_CATEGORIES); no match table 52 (NO_MATCH); and representative query (RQ) table 54.

As noted, the illustrated structure of database 30 is simplified. Depending on the nature of additional features of server 16 that are not detailed herein, database 30 may include many more tables, Illustrated fields may store text, integers, timestamps, or the like. Similarly, each illustrated table may include many more columns (or fields) than those detailed herein.

As illustrated, responses table 32 (RESPONSES) includes columns (and therefore fields) for storing data representative of a response identifier (RESPONSE_ID-int); response category (CATEGORY_ID-int); response title (TITLE-varchar (50)); a response (or response link) (RESPONSE-varchar (6000)); a Boolean expression used to locate the response (BOOLEAN_EXPR-varchar (5000)); a date modified (DATE_MODIFIED-timestamp); language of response (LANGUAGE_ID-int) and a status (STATUS-int). Response table 32 stores responses presented to users of server 16 in response to queries to locate specific information.

Each category of response is particularized in table 40. Table 40 includes a numerical identifier of each category (CATEGORY_ID-int); and a text identifier of each category in field (CATEGORY-varchar(250)). Each category entry further includes a field identifying a link to a parent category (PARENT_CATEGORY-int). Table 40 allows an operator to categorize responses in table 32. For example, responses in an information base may be categorized by topic (product, service, geographical locale, etc.) Table 40 allows an operator to organize (view, sort, etc), responses hierarchically such that available categories of responses may be presented as a tree.

Suggested response table 34 SUGGESTED_RESPONSES) includes columns (and therefore fields) for storing data representative of a related response (RESONSE_ID) as contained in table 32; and a suggested response (SUGGESTED_ID) identifying a further response that a user seeking a response in table 32 may be interested in. As such, for each response in table 32, one or more suggested additional responses, believed to be of interest to a seeker of the response in table 32 may be stored.

Linked response table 36 (LINKED_RESPONSES) includes columns (and therefore fields) for storing data representative of responses linked to a particular response identified in response id field (RESONSE_ID-int) contained in table 32; in a linked response field (LINKED_ID-int) identifying a further response that a user seeking a response in table 32 will be presented along with a sought response. Again, for each response indexed in table 32, multiple linked responses may exist in table 36. In this way, multiple responses may be combined and presented in combination.

Table 38 identifies in full text (in field LANGUAGE-varchar(50)) the language of a particular text (as, for example stored in tables 32 and 52), numerically identified in language id field (LANGUAGE_ID-int).

Table 54 identifies representative queries, as entered by an operator and foreseeably addressed by an associated response stored in table 32. Each RQ is identified by an RQ identifier (RQ_ID). The associated response is also identified (RESPONSE_ID). The RQ as entered is stored in RQ_ORIGINAL. As well, the RQ as modified by indexing software 29, as discussed below, is stored in RQ_REVISED.

User queries may optionally be stored within tables 42 and 48. Further, user identities may optionally be stored within table 44.

Specifically, information about known users may be stored in table 44, Fields representing the users first name (FIRSTNAME-varchar(75)); lastname (LASTNAME-varchar(50)); e-mail address (EMAIL-varchar(50)); date added (DATE_ADDED-timestamp).

Inquiries table 42 may store records of queries processed by server 16. Each record within inquiries table 42 stores a field identifying the user (USER_ID)-int) of a query; a field identifying the date of the query (INQUIRY_DATE-timestamp); the query (INQUIRY-varchar(1000)); the provided response (RESPONSE_ID-int).

Compound expressions table 46 further stores compound expressions that may be used by indexing software 29 to modify RQs, in manners exemplary of embodiments of the present invention, as detailed below. Each compound expression is identified numerically (COMPOUND_ID-int); by name (COMPOUND_NAME-varchar(50)) and category (COMPOUND_CAT_ID-int). Expression field (EXPRESSION-varchar(4000)) stores the text string representative of the compound expression.

Compound expressions may be placed in categories, which in turn may be identified and linked in table 50 including category id (COMPOUND_CAT_ID-int); text category (COMPOUND_CAT-varchar(250)); and a field identifying the parent compound category (PARENT_COMP_CAT), allowing these to be arranged hierarchically by an operator.

Table 48 stores non-standard queries of users. For each non-standard query, an identifier of the query (SP_INQUIRY_ID-int), the user id (USER_ID-int), inquiry date (SP_INQUIRY_DATE-timestamp) and query (SPECIAL_INQUIRY -varchar(4000)) are stored.

Of note, response table 32 includes a table entry for each indexed response. Each table entry includes a field RESPONSE—containing full text (or a link thereto) to the full text of an indexed response. As well, each entry of table 32 includes an entry, BOOLEAN_EXPR, identifying a Boolean expression that should be satisfied by an expected query for the response contained within the entry of table 32. Expressions contained in BOOLEAN_EXPR for the various table entries in table 32 are applied to identify matching responses.

Of additional note, each response entry includes an associated TITLE field that contains text succinctly identifying the nature of the response that has been indexed. The TITLE field may contain a conventional title or abstract, or any other succinct, relevant summary of the contents of the RESPONSE field of the entry.

Figure 4:
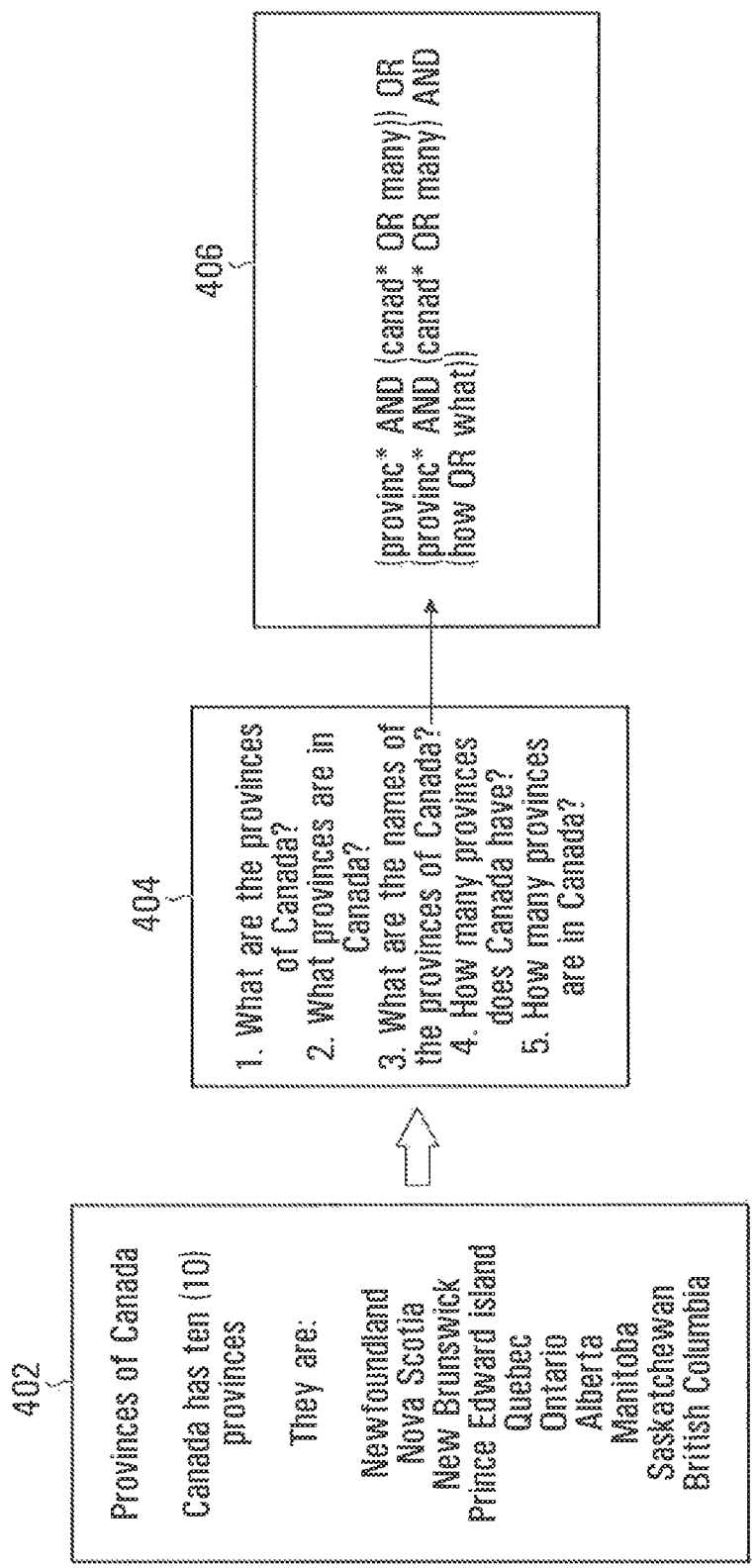
FIG. 4 illustrates an exemplary response, associated representative questions and an associated Boolean expression.
Figure 5A:
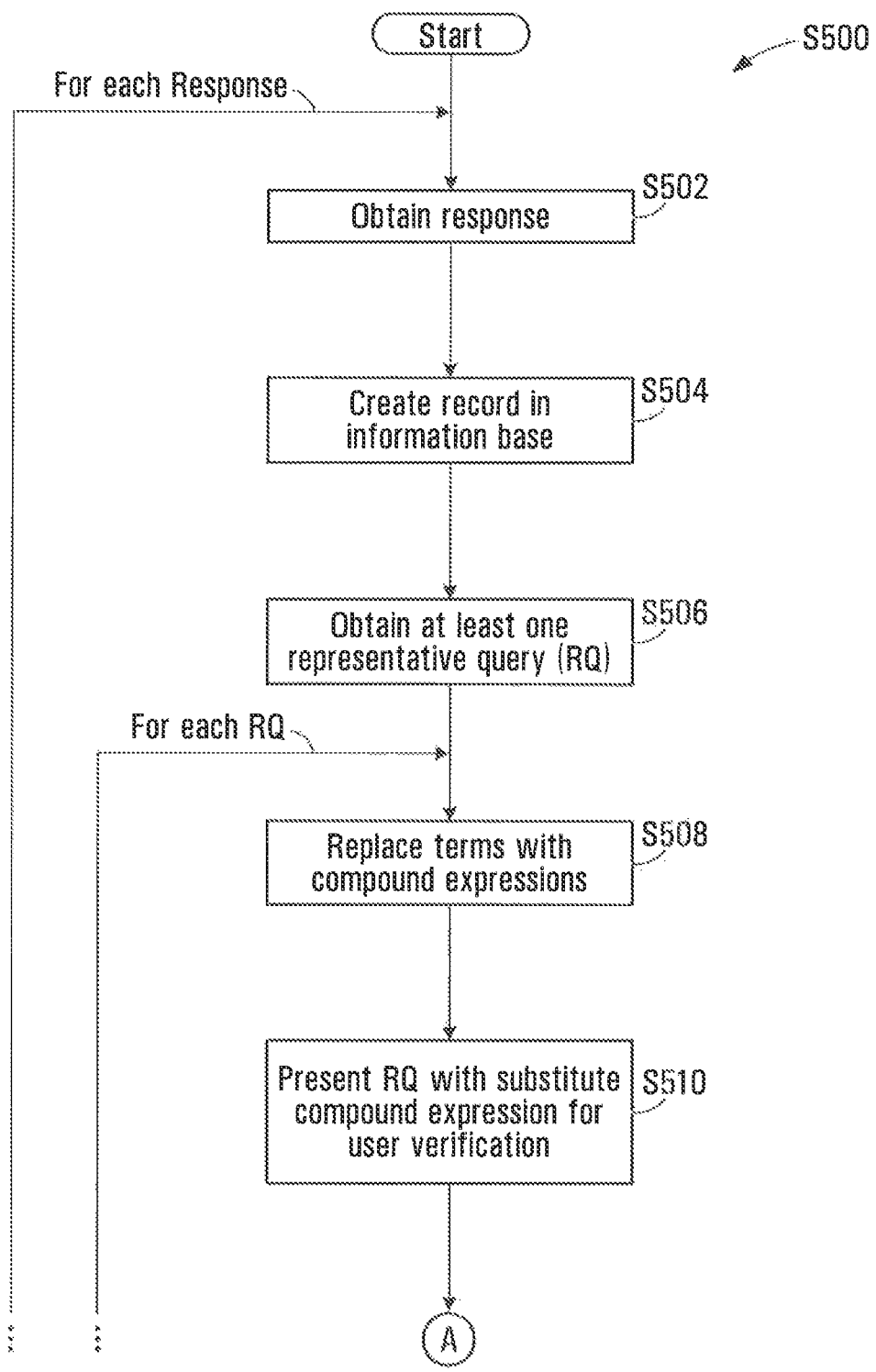
FIGS. 5A to 5E illustrate exemplary steps performed at the server of FIG. 1 in automated indexing of responses.
Figure 5B:
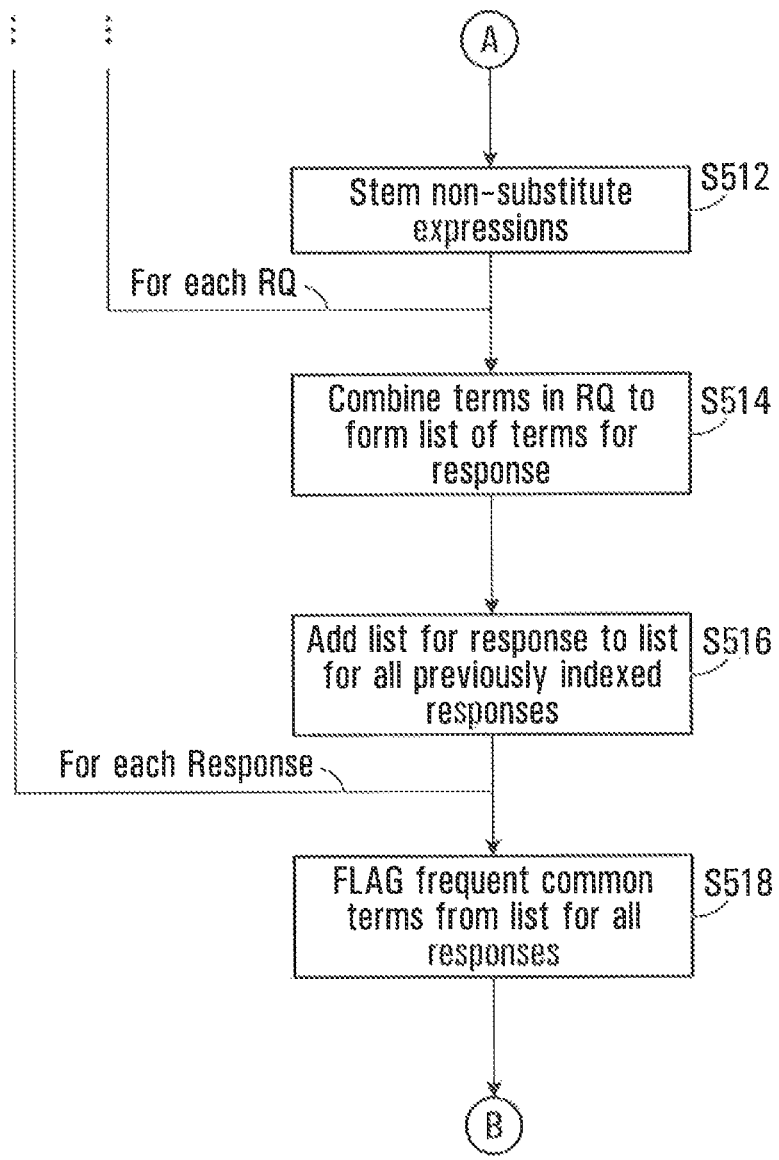
Figure 5C:
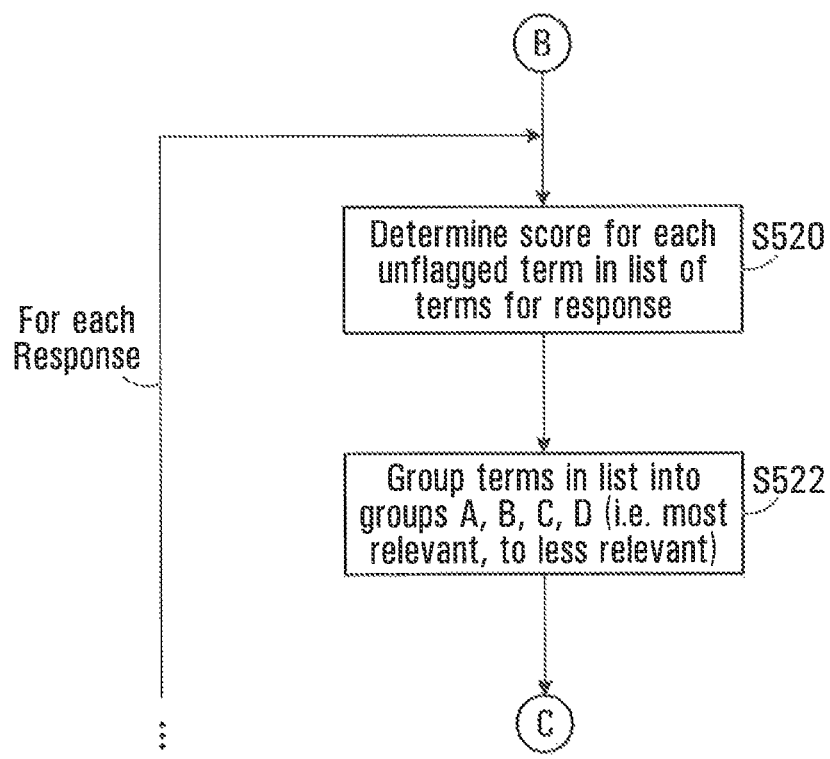
Figure 5D:
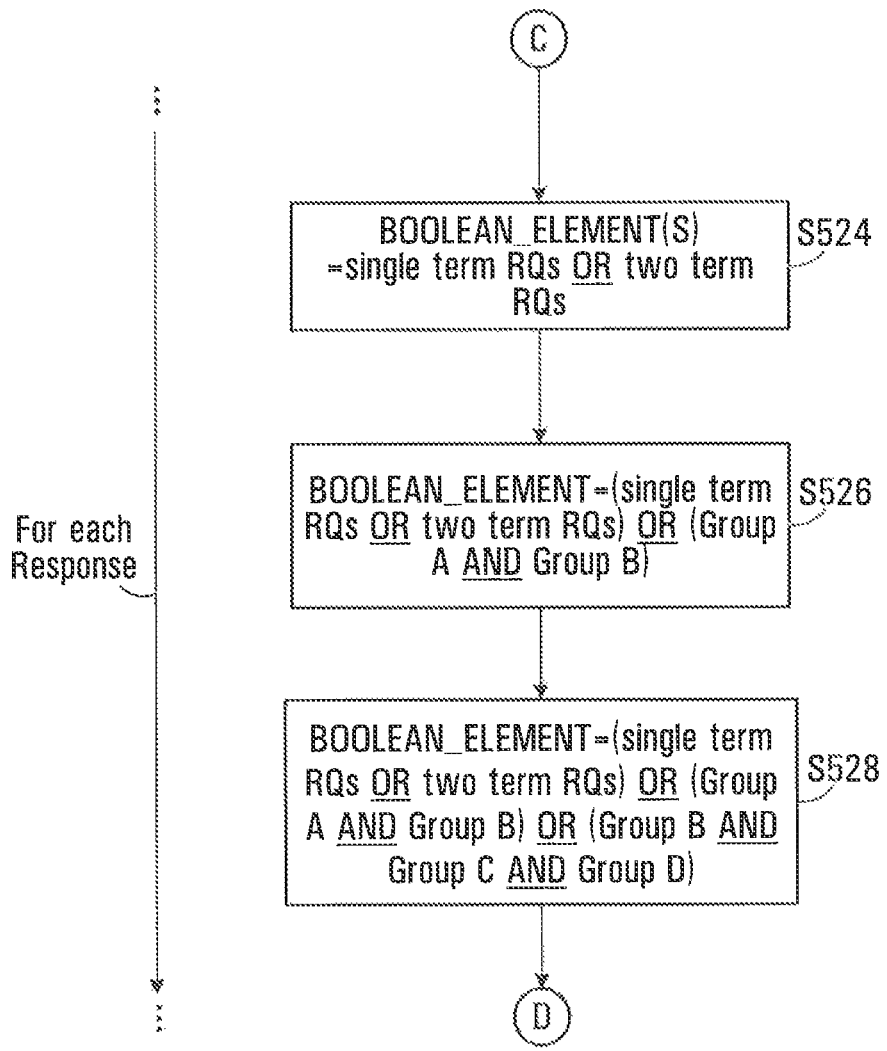
Figure 5E:
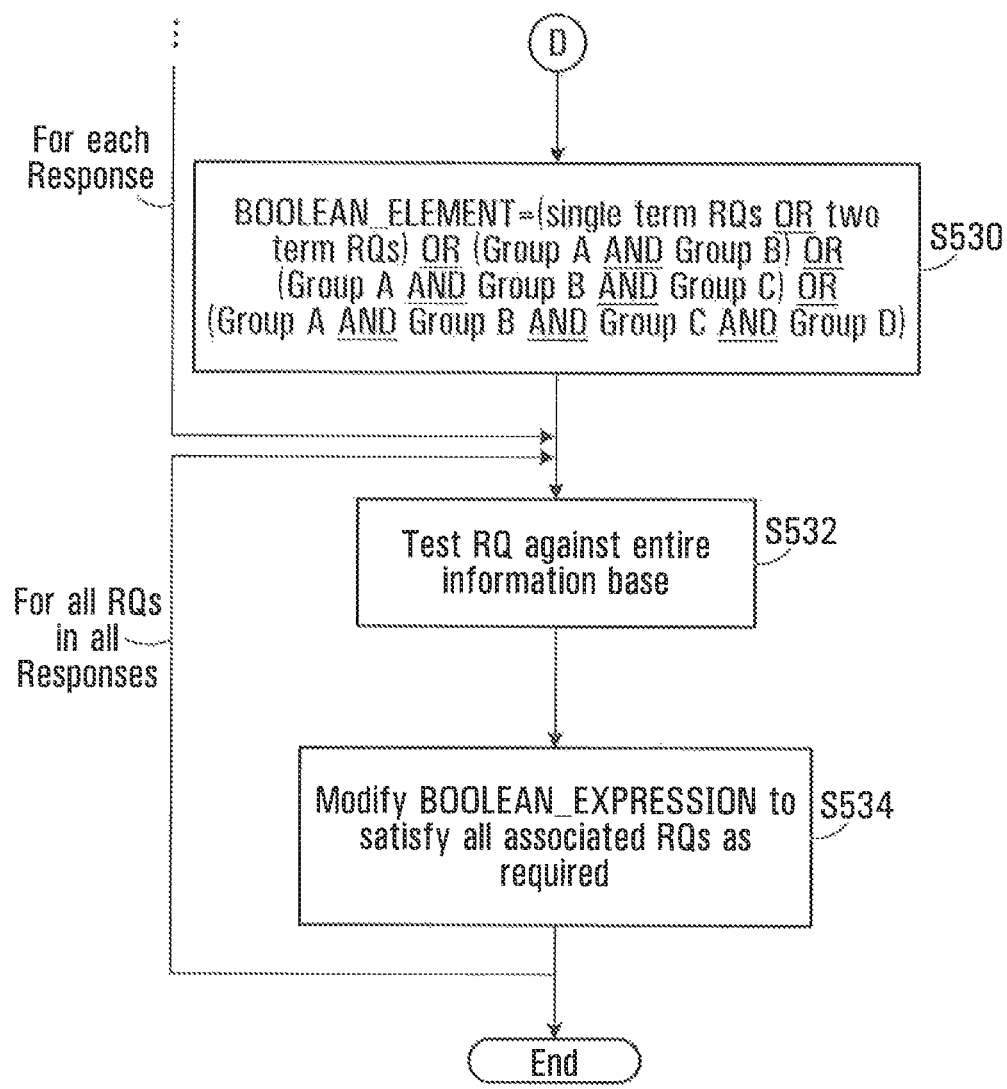

To better appreciate use of server 16 and database 30, FIG. 4 illustrates an example response 402 to be indexed for searching by server 16. Specifically, example response 402 may be data in any computer understandable form. For example, response 402 could be text; audio; an image; a multimedia file; an HTML page. Response 402 could alternatively be one or more links to other responses. For example, response 402 could simply be a hypertext link to information available somewhere on network 10, (for example at one of servers 18). Response 402 may be associated with a plurality of representative queries (RQs) 404 entered by an operator, which are anticipated to be satisfied by response 402. That is, response 402 when presented by a computer in a human understandable form (e.g. natural language) provides a satisfactory answer to a user presenting any one of RQs 404.

RQs are preferably plain text queries. For illustration only, illustrated response 402 is a text representation of Canadian provinces, and an introduction to these provinces. Typical RQs 404 for which response 402 is satisfactory are also depicted and may include:

1. "What are the provinces of Canada?"
2. "What provinces are in Canada?"
3. "What are the names of the provinces of Canada?"
4. "How many provinces does Canada have?"
5. "How many provinces are in Canada?"

RQs 404 in turn may be used to formulate one or more Boolean expressions 406, containing one or more terms satisfied by the queries. Boolean expressions may be automatically formulated from RQs entered by operators, as disclosed in the '001 application. For example, Boolean expression 406 may be automatically formulated from RQs 404. Boolean expressions may also be formulated manually by an operator, as disclosed in the '409 patent.

Boolean expression 406 is stored within database 30, in the BOOLEAN_EXPR field of table 32 storing response 402. The actual response in a computer understandable format is also stored within the associated record in table 32. Similar Boolean expressions are developed for other responses indexed by database 30, and stored in table 32.

Each record within table 32 stores a response and associated Boolean expression.

Preferably, an operator also considers which other responses a user seeking a particular (i.e., primary) response within table 32 may be interested in. Suggested response table 34 may be populated by the operator with identifiers of such other suggested responses. Each other suggested response is identified in table 34 by a suggested response identifier (in the SUGGESTED_ID field), and linked to a primary response in table 32. So for the example response 402, suggested responses may answer queries such as "What are the capitals of the provinces?": "What are the territories of Canada?", and the like.

Additional responses may also be incorporated by reference in a particular response. Such additional responses may be presented in their entirety along with a sought response in table 32. References to the additional responses are stored in table 34 (in SUGGESTED field), with a reference to a primary response in table 32 (stored in the REPSONSE_ID field).

In the preferred embodiment, database 30 is populated with Boolean expressions representative of natural language queries. As such, the interface provided to the end-user preferably indicates that a natural language query is expected. Of course, Boolean expressions could be formulated for other queries having a syntax other than natural language.

Server 16 accordingly is particularly well suited for indexing a single network site, operated by a single operator, having related/suggested responses. The operator may further tailor the contents of the web site to logically separate the content of responses into categories, bearing in mind RQs to be answered by each response.

As noted, one challenge faced by operators preparing suitable RQs for each response is the need to anticipate variations in text queries from information seekers. For example, a user seeking information addressed by response 402 may use the language "What number of provinces are in Canada?" instead of the anticipated language of RQs 404, such as query 5: "How many provinces are in Canada?" As such, the query "What number of provinces are in Canada?" may fail to satisfy the Boolean expression(s) formulated from RQs 404. Consequently, the query might not be matched to response 402 when the Boolean expression(s) associated with response 402 are applied to the query. This may especially be the case when the Boolean expression(s) are automatically formulated from RQs, such that tolerance of the Boolean expression(s) to variations in text queries inherently relies on tolerance to such variations of the underlying RQs.

One way to provide RQs with tolerance to variations in text queries is to store compound expressions in table 46 which define groups of variants, related or equivalent terms, and then substitute those compound expressions into RQs during indexing. For example, a compound expression ("How many" OR "What number of") may be stored to define an equivalency between the terms "How many" and "What number of." Query 5 may then be modified by substituting the term "How many" with this compound expression to produce the following modified RQ:

"("How many" OR "What number of") provinces are in Canada?"

As will be apparent from the discussion below, a Boolean expression automatically formulated from RQs including this modified RQ is satisfied by both "How many provinces are in Canada?" and "What number of provinces are in Canada?", allowing response 402 to be matched to either query.

Compound expressions may be substituted into RQs containing any of the terms in that compound expression. For example, an RQ such as "What number of provinces are in Canada?" may also be modified to be "("How many" OR "What number of") provinces are in Canada?"

As noted, compound expressions define groups of terms having related meaning, such as "How many" and "What number of". Other example compound expressions may be:

1. (like OR "similar to")
2. (like OR love OR favor OR adore)
3. (engine OR motor OR "internal combustion engine")
4. (favor OR favour)
5. (annually OR anually OR annualy)
6. (IntelliResponse OR IR)

As is apparent from the above examples, compound expressions may define equivalencies between terms (words or phrases) having synonymous or closely-related meanings: such as "like" and "similar to."

Of note, the meaning of terms may shift depending on context. For example, while the term "like" may have similar meaning to "similar to" in some contexts, in other contexts, the term have similar meaning to "love", "favour" or "adore." Thus the same term (e.g., "like") may appear in multiple compound expressions, and these compound expressions may not be appropriate substitutes for that term in all contexts. For example, substituting the word "like" in an RQ such as "Is an apple like an orange?" by the compound expression (like OR "similar to") may be appropriate, but substituting the word "like" in an RQ such as "Do you like ice cream?" by the same compound expression would produce a nonsensical result. Similarly, substituting the word "engine" in an RQ relating to internal combustion engines by the compound expression (engine OR motor OR "internal combustion engine") may be appropriate, but substituting the word "engine" in an RQ relating to steam engines by the same compound expression may not be appropriate.

Compound expressions may also define groups of variants including anticipated misspellings: e.g., (annually OR anually OR annualy), including regional variants of terms: e.g., (favor OR favour), and/or including abbreviations or acronyms: e.g., (IntelliResponse OR IR). Other forms of compound expressions will be apparent to those of ordinary skill in the art, which may also be stored in table 46.

It will be appreciated that the example compound expressions shown above have been shortened for illustrative purposes. Each compound expression may contain many more terms than shown in any of these examples. Further, different types of variants may be mixed within a single compound expression such that a compound expression includes, for example, both synonyms and misspellings.

it will further be appreciated that the above-described compound expressions are merely one type of expressions that may be used to replace terms in RQs. In other embodiments, other types of expressions may be used, e.g., to substitute terms in a first language by terms in a second language, or to substitute terms representing International Standard Book Numbers (ISBNs) by expressions representing corresponding book titles. Other types of expressions will be apparent to those of ordinary skill. All such expressions, including compound expressions, may be referred to generally as substitute expressions.

Compound expressions preferably take the form of Boolean expressions, such that the related terms contained therein are joined by Boolean logic.

By substituting terms in RQs by compound expressions, RQs are modified to anticipate and tolerate use of variants defined in those compound expressions. As detailed below, Boolean expressions automatically generated from modified RQs may be used to match responses to queries from information seekers, notwithstanding the use of such variants by information seekers.

Historically, it was necessary for operators to manually consider whether each RQ should be modified according to stored compound expressions, and then to modify the RQs when appropriate. This task is labour intensive. The '001 application discloses that for each RQ, compound expressions containing terms of that RQ may be automatically identified and/or substituted into RQs. However, as discussed, because the meaning of terms may shift depending on context, a compound expression may only be an appropriate substitute for a term in some contexts. Substitutions that are made without considering context may result in nonsensical RQs. Thus, there is still a need to rely on skill and judgment of operators to determine whether each substitution is appropriate.

Accordingly, exemplary of embodiments of the present invention, server 16 stores indexing software 29 executable at server 16 to index responses. Indexing software 29 automatically determines when substitutions of terms in RQs by compound expressions are appropriate, based on past substitutions made by operators, and automatically makes appropriate substitutions, in manners exemplary of embodiments of the present invention.

The operation of indexing software 29 is depicted in FIGS. 5A-5E. In particular, indexing software updates an information base of responses in database 30 to include one or more new responses by performing blocks 5500 and onward. All administrative input may be inputted at server 16, or elsewhere, by an operator familiar with the response.

Specifically, the response and other input may be inputted through the administrative interface, by an operator in block S502. Accordingly, for each new response, a record 32 is added to database 30 in block S504. Next, RQs for the new response are collected from the operator. As noted, RQs are contemplated natural language queries for which answers are believed to be provided in associated response. In block S506, the collection RQs for each response is collected from the operator and stored.

For illustration purposes, assume one such new response details the functionality of server 16, hosting an information base, and operating software for searching and indexing the information base, made available under the trademark IntelliResponse™.

For this example response, RQs may for example be:
1. "is IntelliResponse a search engine?"
2. "How is IntelliResponse different than search?"
3. "Are you like SearchEngineX?"
4. "Are you like SearchEngineY?"
5. "Search"
6. "Search engine"
7. "Does IntelliResponse return multiple answers?"
8. "What is the difference between you and SearchEngineX?"

Further, for illustration purposes, assume that table 46 stores only the six compound expressions discussed above, namely:
1. (like OR "similar to")
2. (like OR love OR favor OR adore)
3. (engine OR motor OR "internal combustion engine")
4. (favor OR favour)
5. (annually OR anually OR annualy)
6. (IntelliResponse OR IR).

Of course, it will be appreciated that in practice, table 46 will contain many more compound expressions.

Further, for illustration purposes, assume that an operator, exercising skill and judgment, has manually considered potential substitutions for the first three RQs and made the following substitutions terms in these three RQs by compound expressions:
1. "Is (IntelliResponse OR IR) a search engine?"
2. "How is (IntelliResponse OR IR) different than search?"
3. "Are you (like OR "similar to") SearchEngineX?"

Of note, the operator has declined to substitute the term "engine" in RQ 1 by the compound expression (engine OR motor OR "internal combustion engine") as this substitution in inappropriate given the meaning of the word "engine" in the context of RQ 1.

In block S508, the remaining RQs (4-8) are processed to automatically substitute terms in these RQs by compound expressions, when appropriate, based on past substitutions. Appropriate substitutions are determined and made in block S508 by performing blocks S700 and onward for the first remaining RQ (RQ 4), and then repeating blocks S700 and onward for the other remaining RQs.

For each RQ, in block S702, terms in that RQ for which potential substitutions exist are identified. First, those compound expressions stored in table 46 which include terms in common with the RQ are identified. Conveniently, when compound expressions are stored in the form of Boolean expressions, those compound expressions including terms in common with the RQ may be identified as those compound expressions having Boolean logic satisfied by the RQ.

For example, for the RQ 4, "Are you like SearchEngineY?", two of the six compound expressions are identified as having terms in common with this RQ, namely:
1. (like OR "similar to")
2. (like OR love OR favor OR adore).

In this way, these two compound expressions are identified as possible substitutes for terms in RQ 4.

Next, RQ 4 is parsed to identify those terms in RQ 4 which match terms in these two compound expressions, i.e., to identify those terms that are target terms for potential substitutions.

TABLE 1, below, summarizes the results of this parsing for RQ 4. TABLE 1, also shows, for illustration purposes, the results that would be obtained by performing block S702 for each of the other RQs. In this table, the left-hand column shows target terms in RQs underlined, and the right-hand column shows the corresponding compound expressions for potential substitutions.

TABLE 1

| TARGET TERMS IN RQS | COMPOUND EXPRESSIONS |
|---|---|
| 1. "Is IntelliResponse a search engine?" | (engine OR motor OR internal combustion engine) (IntelliResponse OR IR) |
| 2. "How is IntelliResponse different than search?" | (IntelliResponse OR IR) |
| 3. "Are you like SearchEngineX?" | (like OR "similar to") (like OR love OR favor OR adore) |
| 4. "Are you like SearchEngineY?" | (like OR "similar to") (like OR love OR favor OR adore) |
| 5. "Search" | None |
| 6. "Search engine" | (engine OR motor OR "internal combustion engine") |
| 7. "Does IntelliResponse return multiple answers?" | (IntelliResponse OR IR) |
| 8. "What is the difference between you and SearchEngineX?" | None |

As shown in TABLE I, for RQ 4, only one term "like" is identified as being a potential target for substitution.

Next, blocks S704 and onward are performed to evaluate the appropriateness of potential substitutions for the target term "like" in RQ 4. In block S704, two potential substitutions for this target term are identified, namely:
1. substitute "like" by (like OR "similar to")
2. substitute "like" by (like OR love OR favor OR adore)

As is clear, only the first of these potential substitutions is appropriate given the meaning of the target term "like" in the context of RQ 4, To automatically determine whether or not each of these substitutions is appropriate, indexing software 29 analyzes past substitution made by operators involving the term "like" and these two compound expressions, to "learn" how those operators have evaluated the appropriateness of these past substitutions. In this way, indexing software 29 emulates past substitutions decisions made by operators, and thereby takes benefit from the skill and judgment exercised by those operators in making those decisions.

In learning from past decisions, an inherent assumption is made that past substitutions were made in similar contexts, such that the meaning of the target term (e.g., "like") is constant between the context of the current RQ (e.g., RQ 4) and the contexts of at least some of the past substitutions.

Indexing software 29 may, for example, learn from the past substitutions decisions made for the first three RQs. Indexing software 29 may also learn from past substitution decisions made for RQs associated with other responses in the information base. The assumption that past substitutions were made in a similar context is most likely to hold true for past substitutions in RQs associated with the example response. This assumption is less likely to hold true for past substitutions in RQs associated with responses sharing a categorization with the example response, e.g., as identified by the stored CATEGORY_ID for the responses. This assumption is even less likely to hold true for past substitutions in RQs associated with other responses in the information base (e.g., sharing no categorization with the example response).

Figure 6:
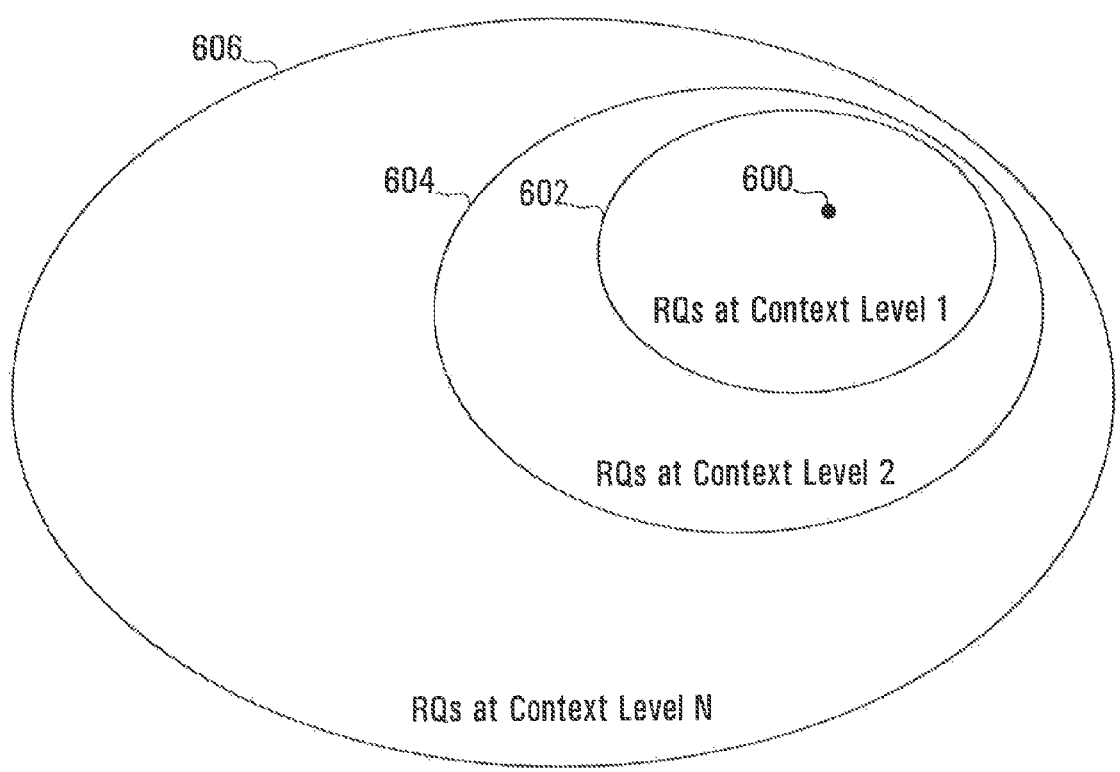
FIG. 6 illustrates an exemplary organization of representative questions into nested context levels.
Figure 7:
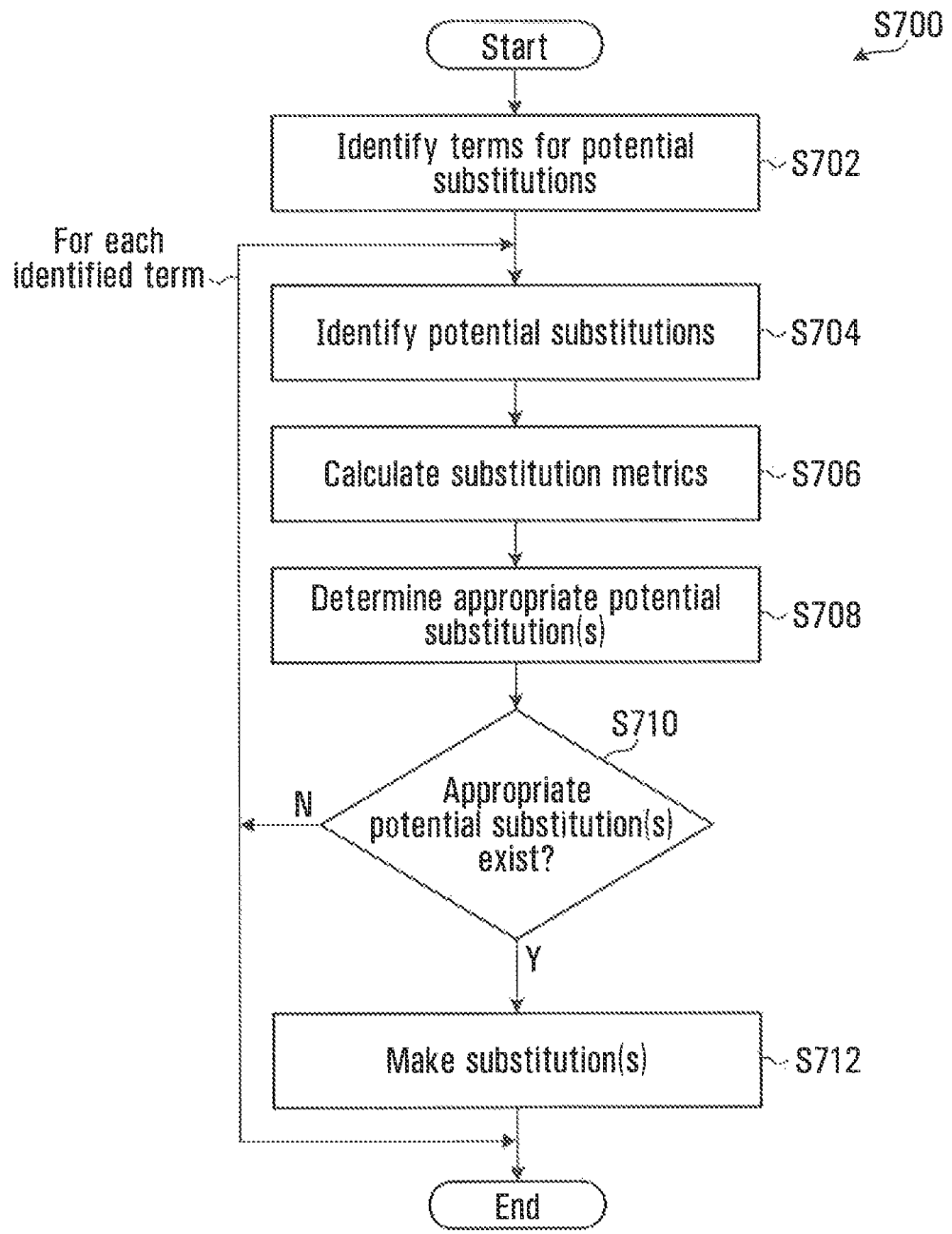
FIGS. 7 and 8A-8C illustrate exemplary steps performed at the server of FIG. 1 in substituting terms in representative queries by compound expressions during automated indexing of responses.

Accordingly, RQs from which learning may be derived may be organized into nested "context levels", as illustrated in FIG. 6, where RQs in lower (inner) context levels are likely closer in context to the current RQ, and RQs in higher (outer) context levels are likely farther in context to the current RQ. As depicted, the current RQ may be represented by RQ 600. At context level 1, learning may be derived from RQs in group 602, containing those RQs associated with the same response as RQ 600. At context level 2, learning may be derived from RQs in group 604 containing those RQs associated with responses sharing a categorization with the response of RQ 600. For the highest context level, learning may be derived from RQs in group 606 containing all RQs in the information base. Of note, group 606 contains all of the RQs of group 604, which in turn contains all of the RQs of group 602. Given further hierarchical categorization of responses, further context levels may be additionally defined.

Of note, as it is desired to learn from past decisions made by operators to take benefit from the exercise of skill and judgment by those operators, the most instructive past substitutions are those in RQs that have been manually processed by operators. Thus, in some embodiments, when determining the appropriateness of a potential substitution only those past substitutions that were manually made by operators, and/or those past substitutions that that were manually confirmed by operators are considered.

After identifying potential substitutions for a target term in block S704, in block S706 metrics may be calculated to measure the appropriateness of each substitution, taking into account past substitutions made by operators. These metric will hereinafter be referred to as "substitutability metrics."

In an example embodiment, substitutability metrics may be calculated from the following data describing past substitutions and the set of RQs in which those substitutions were made:

(i) the number of occurrences of the target term in the processed RQs (representing the number of times the target term was not substituted by any compound expression);

(ii) the number of occurrences of the particular compound expression in the processed RQs (representing the number of times any term was substituted by the particular compound expression;

(iii) the number of occurrences of the target term in the unprocessed (original) RQs (i.e., the number of possible substitutions); and (iv) the number of processed RQs.

Processed RQs refers to those RQs for which potential substitutions have been considered. As noted above, in some embodiments, when determining the appropriateness of a potential substitution, only those past substitutions that were manually made by operators, and/or those past substitutions that were manually confirmed by operators are considered. Therefore, in these embodiments, processed RQs refers to those RQs that have been manually processed by operators.

Conveniently, the above data may be obtained simply by counting the number of occurrences of the target term (before and after processing), the number of occurrences of the particular compound expressions (after processing), and the number of processed RQs. Thus, in some embodiments, detailed records of each past substitution need not be stored.

As will be appreciated, the set of relevant RQs, i.e., the set of RQs from which learning is derived, will vary depending on the context level. Thus, for each possible substitution, a substitutability metric may be calculated for each context level 1 to N. For the exemplary processing of the current RQ, discussed below, context level 1 and context level 2 are used.

An exemplary formulation of a substitutability metric is Equation 1:

$$S_n = \frac{\text{NUM\_TERM\_PROC}_n + 1}{\text{NUM\_TERM\_UNPROC}_n + 1} - \frac{\text{NUM\_EXPR\_PROC}_n - 1}{\text{NUM\_RQ}_n}$$

where n denotes the context level;

$S_n$ is the substitutability metric for context level n;

$\text{NUM\_TERM\_PROC}_n$ is the number of occurrences of the target term in the processed RQs for context level n;

$\text{NUM\_EXPR\_PROC}_n$ is the number of occurrences of the particular compound expression in the processed RQs for context level n;

$\text{NUM\_TERM\_UNPROC}_n$ is the number of occurrences of the target term in the unprocessed (original) RQs for context level n; and $\text{NUM\_RQ}_n$ is the number of RQs for context level n.

In the example embodiment, calculation of substitutability metric $S_n$ takes into account the amount of available data from which learning may be derived. Accordingly, at each context level, two constants may be defined:

$\text{CONST\_SMALL\_EXPR}_n$, representing a small number of occurrences of the particular compound expression in the processed RQs for context level n; and $\text{CONST\_SMALL\_RQ}_n$, representing a small number of RQs for context level n.

If the number of occurrences of the particular compound expression in the processed RQs is small, i.e., if $\text{NUM\_EXPR\_PROC}_n \leq \text{CONST\_SMALL\_EXPR}_n$, then $S_n$ may be calculated according to Equation 2:

$$S_n = \frac{\text{NUM\_TERM\_PROC}_n + 1}{\text{NUM\_TERM\_UNPROC}_n + 1} + \min\left(.25, \frac{\text{NUM\_RQ}_n}{20 \times (\text{NUM\_EXPR\_PROC}_n + 1)}\right).$$

Further, if the number of occurrences of the particular compound expression in the processed RQs is not small, but the number of RQs is small, i.e., $\text{NUM\_TERM\_PROC}_n > \text{CONST\_SMALL\_EXPR}_n$, and $\text{NUM\_RQ}_n \leq \text{CONST\_SMALL\_RQ}_n$, then $S_n$ may be calculated according to Equation 3 (same as Equation 1):

$$S_n = \frac{\text{NUM\_TERM\_PROC}_n + 1}{\text{NUM\_TERM\_UNPROC}_n + 1} - \frac{\text{NUM\_EXPR\_PROC}_n - 1}{\text{NUM\_RQ}_n}$$

Finally, if the number of occurrences of the particular compound expression in the processed RQs is not small, and the number of RQs is also not small, i.e., if $\text{NUM\_TERM\_PROC}_n > \text{SMALL\_EXPR}_n$ and $\text{NUM\_RQ}_n > \text{CONST\_SMALL\_RQ}_n$, then $S_n$ may be calculated according to Equation 4:

$$S_n = \frac{\text{NUM\_TERM\_PROC}_n + 1}{\text{NUM\_TERM\_UNPROC}_n + 1} -$$

-continued $$\frac{NUM\_EXPR\_PROC_n - 1}{CONST\_SMALL\_RQ_n + \sqrt{\frac{NUM\_RQ_n - }{CONST\_SMALL\_RQ_n}}}$$

As the amount of available data from which learning may be derived is greater in higher context levels, the constants $CONST\_SMALL\_EXPR_n$, and $CONST\_SMALL\_RQ_n$ may be assigned values that are commensurately greater for higher context levels. For example, these constants may be assigned the following values for context level 1 and context level 2:

$CONST\_SMALL\_EXPR_1=1$ $CONST\_SMALL\_EXPR_2=10$ $CONST\_SMALL\_RQ_1=5$ $CONST\_SMALL\_RQ_2=500$.

When the substitutability metrics $S_n$ are calculated using any of Equations 1-4 above, a lower value indicates that a potential substitution is more appropriate while a higher value indicates that a potential substitution is less appropriate.

It will be appreciated that Equations 1-4 for calculating substitutability metrics $S_n$ are exemplary only. Other formulas and heuristics for calculating substitutability metrics will be readily apparent to those of ordinary skill in the art.

TABLE 2 below shows, for illustration purposes, values of substitutability metrics $S_n$ that may be calculated, for example, for the two potential substitutions identified in block S706, for context level 1 and context level 2.

TABLE 2

| POTENTIAL SUBSTITUTION | $S_1$ | $S_2$ |
|---|---|---|
| substitute "like" by (like OR "similar to") | 0.3 | 0.05 |
| substitute "like" by (like OR love OR favor OR adore) | 0.8 | 1.2 |

As shown in TABLE 2, the value of $S_1$ is lower for the first potential substitution than the second potential substitution based on the substitution made by the operator for RQs 3, where the term "like" was substituted for the compound expression (like OR "similar to"). The lower value of $S_1$ for first potential substitution indicates that based on the learning derived from context level 1, the first substitution is more appropriate than the second substitution. The values of $S_2$ reflect example values, based on possible past substitutions for context level 2 (not shown).

Next, in block S708 the calculated substitutability metrics ($S_1$ and $S_2$) are assessed to determine the appropriateness of each potential substitution. For each determination, the substitution may be marked with one of the following labels: SUBSTITUTE, DO_NOT_SUBSTIUTE, COVERED, or UNCERTAIN.

The SUBSTITUTE label indicates that the potential substitution for the target term is appropriate. The DO_NOT_SUBSTITUTE label indicates that the potential substitution for the target term is inappropriate. The COVERED label indicates that another substitution has already been determined to be appropriate for the target term. In embodiments where a target term may be substituted with more than one compound expression, the COVERED label may be omitted. Finally, the UNCERTAIN label indicates that the determination of appropriateness is inconclusive, e.g., because insufficient learning has been derived from past substitutions or the derived learning is ambiguous.

Figure 8A:
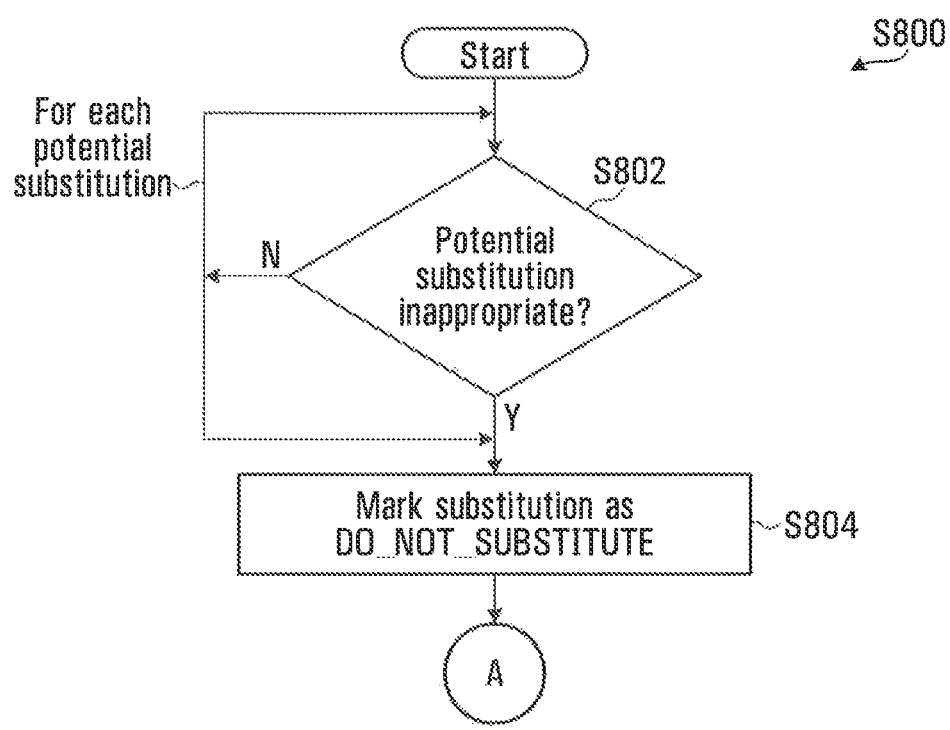
Figure 8B:
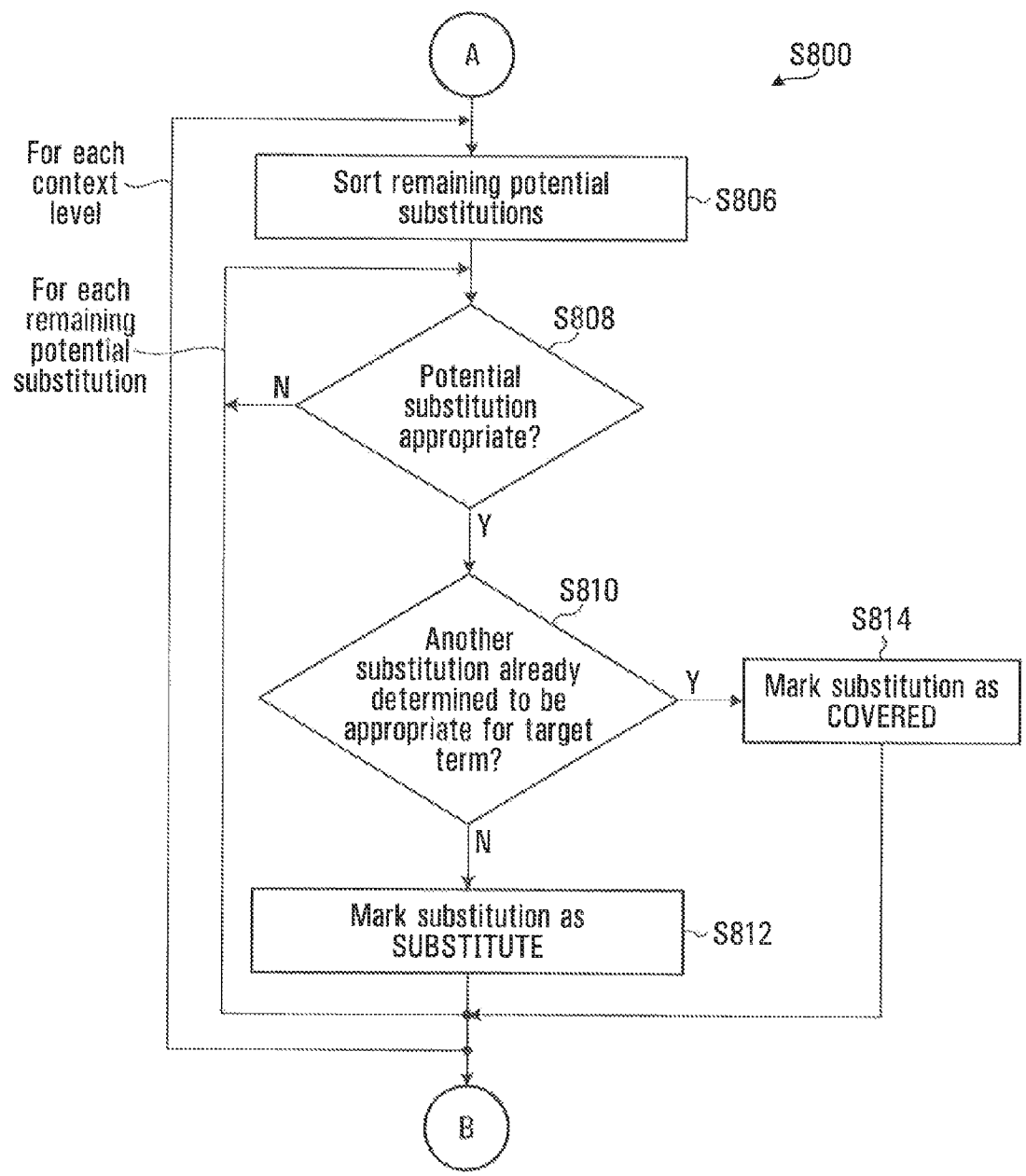
Figure 8C:
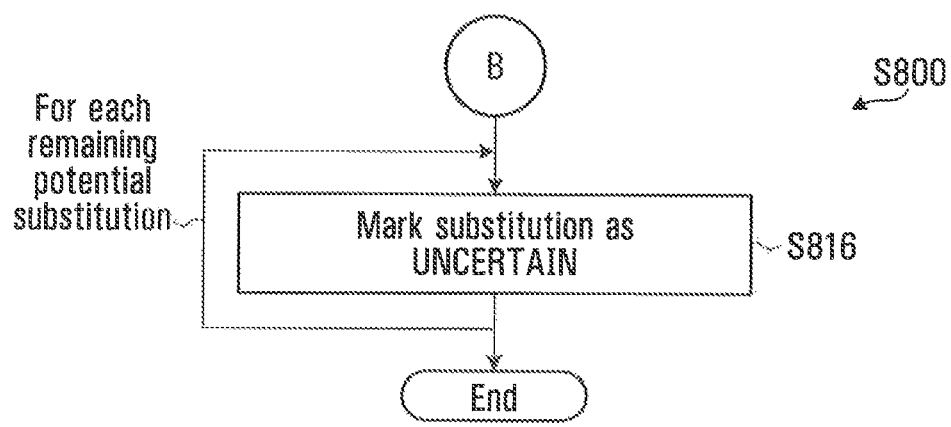
Figure 9:
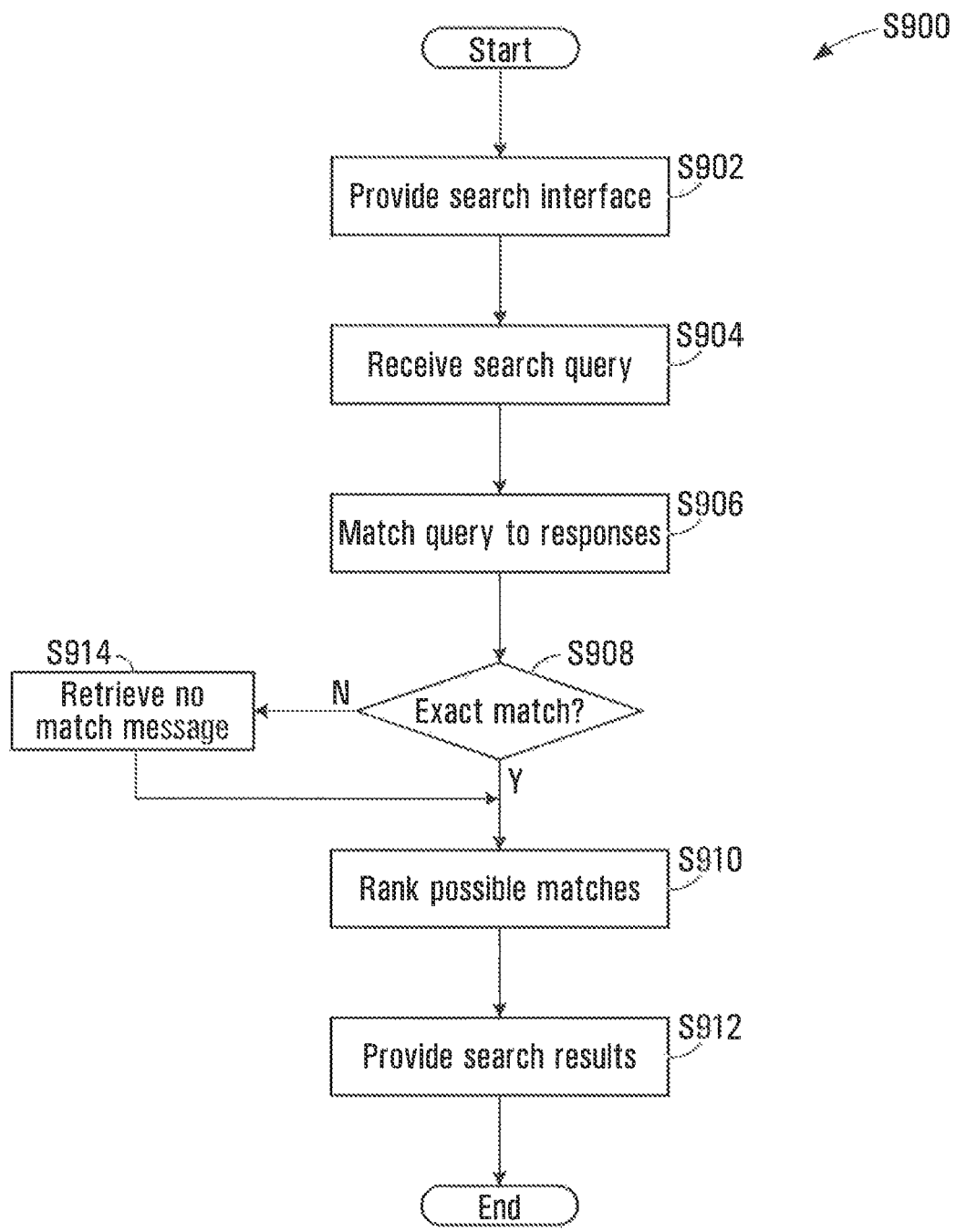
FIGS. 9 and 10 illustrate exemplary steps performed at the server of FIG. 1 in processing a query.

The determination of the appropriateness of each potential substitution is made in block S708 by performing blocks S800 on onward (FIGS. 8A-8C). First, a determination is made in block S802 of whether the potential substitution is inappropriate, based on past substitutions. This determination may be made by comparing the calculated substitutability metrics against pre-defined criteria.

In the example embodiment, a potential substitution is determined to be inappropriate if the following criterion is satisfied:

$(NUM\_TERM\_UNPROC_2 > 2 + 4 \times SL$ AND $S_2 > 0.8$ AND $NUM\_TERM\_UNPROC_1 > 0$ AND $S_1 > 0.90)$ OR
$(NUM\_TERM\_UNPROC_2 > 10 + 20 \times SL$ AND $S_2 > 0.95$ AND $NUM\_TERM\_UNPROC_1 = 0)$.

In the above criterion, SL represents a strictness level that may be set to a value between 0 and 1, where 0 represents the lowest degree of strictness and 1 represents the highest degree of strictness. This strictness level represents the desired amount of learning that must be present before a determination made that a potential substitution is appropriate or inappropriate. The same strictness level value may be used for each context level.

A different criterion may be used to determine if a potential substitution is inappropriate if the target term for a potential substitution contains only common term. Common terms may include selected pronouns, articles, verbs, and the like. Example common terms include "the", "a", "is", "than", "does", Common terms may be stored in database 30 (not specifically illustrated). If the target term contains only common terms, then a potential substitution is determined to be inappropriate if the following criterion is satisfied:

$(NUM\_TERM\_UNPROC_2 > 2+4 \times SL$ AND $S_2 > 0.8$ AND $S_1 > 0.90)$

It will be appreciated that the above criteria are exemplary only, and that other suitable criteria and heuristics will be apparent to those of ordinary skill.

For the two potential substitutions, assuming that SL is set to 0.5, the potential substitution of the target term "like" by the compound expression (like OR love OR favor OR adore) is determined to be inappropriate. The potential substitution is thus marked as DO_NOT_SUBSTITUTE in block 8804.

Next, a determination is made as to whether each of the remaining potential substitutions (i.e., target term is not yet labeled) is appropriate, based on past substitutions. At this stage, context levels are considered sequentially, starting with context level 1. Accordingly, the value of $S_1$ is used first to determine if the potential substitution is appropriate. If this determination is inconclusive, then the value of $S_2$ is used to determine if the potential substitution is appropriate. This may continue for each context level n. In this way, learning derived from each context level may be considered in isolation, sequentially, starting with the closest context level.

At each context level n, the remaining potential substitutions (not determined to be inappropriate) sorted by ascending $S_n$ value in block S806. This allows potential substitutions with the lowest $S_n$ value, i.e., those indicated to be the most appropriate, to be considered first. This sorting is desirable in embodiments where each target term may only be substituted with one compound expression. In such embodiments, sorting the potential substitutions by ascending $S_n$ value ensures that if more than one potential substitution is appropriate, the most appropriate potential substitution is selected.

Next, in block S808, the $S_n$ value is compared against a pre-defined threshold. In the example embodiment, the pre-defined thresholds are defined to be 0.5 for context level 1 ($T_1$), and 0.2 for context level 2 ($T_2$). It will be appreciated that these values of $T_1$ and $T_2$ are exemplary only, and other thresholds apparent to those of ordinary skill may be used.

In the example embodiment, these pre-defined thresholds may optionally be adjusted by to the strictness level (SL) according to the following formula:

$$T_N' = T_N(1-SL),$$

such that A potential substitution is determined to be appropriate when $$S_N < T_N',$$

Assuming as before that the strictness level SL has been set to a value of 0.5, then $T_1'=0.25$ and $T_2'=0.1$.

For the current RQ, the remaining potential substitution is of the target term "like" by compound expression (like OR "similar to"), with $S_1=0.3$ and $S_2=0.05$. First, for context level 1, $S_1$ is compared to $T_1'$. As $S_1$ is greater than $T_1'$, the potential substitution is not determined to be appropriate. Accordingly, processing continues to context level 2, and $S_2$ is compared to $T_2'$. As $S_2$ is less than $T_2'$, the potential substitution is determined to be appropriate.

Next, in block S810, a determination is made as to whether another substitution has already been determined to be appropriate for the target term, if not, then in block S812 the potential substitution is marked as SUBSTITUTE, indicating that the potential substitution has been determined to be appropriate. Otherwise, in block S814 the potential substitution is marked as COVERED, indicating that another potential substitution for the target term has already been determined to be appropriate. As noted, the label COVERED is not used in embodiments that permit a target term to be substituted with multiple compound expressions. In these embodiments, each potential substitution determined to be appropriate may be marked as SUBSTITUTE in block S812.

After a determination of whether each potential substitution is appropriate has been made, any remaining potential substitutions (not determined to be appropriate or inappropriate) are marked with the label UNCERTAIN, indicating that determinations of appropriateness were inconclusive.

After the appropriateness of each potential substitution has been determined for the target term "like" in block S708, the label(s) for each potential substitution is checked in block S710. If any of the potential substitutions are marked with the SUBSTITUTE label, then that substitution is made in block S712. As the potential substitution of the target term "like" by the compound expression (like or "similar to") was marked with the label SUBSTITUTE. RQ 4 is modified in block S712 to make this substitution. Thus. RQ 4 is modified to become:

4. "Are you (like OR "similar to") SearchEngineY?"

Blocks S704-S712 are repeated for each target term in the current RQ. Then blocks S700 and onward are repeated for each remaining RQ (RQs 5-8), Performance of blocks S700 and onward for RQs 5-8 is not detailed herein.

After these blocks have been performed for each RQ, the RQs, as modified where appropriate, may be as follows:

1. "Is (IntelliResponse OR IR) a search engine?"
2. "How is (IntelliResponse OR IR) different than search?"
3. "Are you (like OR "similar to") SearchEngineX?"
4. "Are you (like OR "similar to") SearchEngineY?"
5. "Search"
6. "Search engine"
7. "Does (IntelliResponse OR IR) return multiple answers?"
8. "What is the difference between you and SearchEngineX?"

Of note, the substitutions in RQs 1-3 were manually determined to be appropriate by an operator, while the substitutions in RQs 4-8 were automatically determined to be appropriate by indexing software 29 based on past substitutions.

Optionally, the substitutions automatically determined to be appropriate by indexing software 29 may be presented to an operator for confirmation or rejection in block S510. In some embodiments, only some of the substitutions determined to be appropriate are presented to an operator for confirmation or rejection, e.g., substitutions presented to operators may be screened by their substitutability metrics.

Optionally, a detailed record of substitutions determined to be appropriate, substitutions made, substitutions confirmed by operators and/or substitutions rejected by operators may be stored in one or more tables of database 30 (not detailed herein). For each of these substitutions, the associated detailed record may include the target term, the substitute compound expression, the label as marked in blocks S810-S816, and/or the calculated substitutability metrics. The detailed record may also include the identity of the operator confirming/rejecting the substitution. The detailed record may also include the time/date of when the determination of appropriateness was made.

In some embodiments, potential substitutions marked as UNCERTAIN may be presented to an operator for manually processing in block S510. As the likelihood that potential substitutions are marked as UNCERTAIN increases as the strictness level (SL) is increased, the value of the strictness level may be used to tune the degree of automation of indexing software 29. For example, selecting a high strictness level value will result in more potential substitutions marked as UNCERTAIN, which in turn results in the need to present more potential substitutions to operators for manual processing. Conversely, selecting a low strictness level value will result in fewer potential substitutions marked as UNCERTAIN, which in turn results in the need to present fewer potential substitutions to operators for manual processing.

After RQs have been modified to substitute terms by compound expressions as appropriate, in block S512, any remaining non-substituted terms having a length in excess of a threshold may be stemmed, and extended with wildcard characters. As will be appreciated, stemming is the process for reducing inflected (or sometimes derived) words to their stem, base or root form—generally a written word form. The stem need not be identical to the morphological root of the word; it is usually sufficient that related words map to the same stem, even if this stem is not in itself a valid root. Stemming is often referred to as conflation. Numerous stemming algorithms are known, and include Porter, Lovins, Paice/Husk and Dawson stemming algorithms, Extending a stemmed term is performed so that all terms beginning with the stem, but possibly having further characters appended, may be matched. For example, extending the stem "search" (written as "search*") will match on "search", "searching", "searches", etc.

1. "Is (IntelliResponse OR IR) a search* engine*?"
2. "How is (IntelliResponse OR IR) different than search*?"

3. "Are you (like OR "similar to") SearchEngineX*?"
4. "Are you (like OR "similar to") SearchEngineY*?"
5. "Search*"
6. "Search* engine*"
7. "Does (IntelliResponse OR IR) return* multiple answer*?"
8. "What is the difference between you and SearchEngineX*?"

Next, the collection of terms in each RQ, as modified, may be combined into a list in block S514. As well, common terms may be separately identified. In the following discussion, compound expressions substituted into RQ and incorporated into Boolean expressions are treated as single terms.

For each example representative query, after substitutions and stemming, the list may take the following form:

```
[engine*, (IntelliResponse OR IR), search*, {a, is}]
[different, (IntelliResponse OR IR), search*, than, {how, is}]
[search*]
[engine*, search*]
[SearchEngineX*, {are, (like OR "similar to"),you}]
[SearchEngineY*, {are, (like OR "similar to"), you}]
[answer*, (IntelliResponse OR IR), return* multiple, {does}]
[difference, SearchEngineX*, {and, between, is, the, what, you}]
```

Common terms are identified by the braces { }. Of note, each presented list has been re-ordered alphabetically. This, of course, is purely optional.

Once the multiple lists for the multiple RQs have been created, they may be consolidated in block S514 into a single list of terms. Additionally, the frequency of each term is collected in block S514.

The resulting consolidated list for the multiple example RQs may take the form:

```
answer* 1; engine* 2; SearchEngineX* 2; SearchEngineY* 1;
(IntelliResponse OR IR) 3; different 1; multiple 1; return* 1; search* 4;
than, 1; difference 1; {a 1}; {are 2}; {and 1};
{between 1}; {does 1}; {how 1};
{is 1}; {(like OR "similar to") 2}; {the 1}; {what 1}; {you 3}
```

Now, in block S516, the list for the multiple example RQs for the response is added to a list for all terms for the entire information base within database 30. The frequency of each term within the information base, and within RQs for each response is also maintained.

An example list of terms for the entire information base in database 30 may have the form

```
2009 1; act 1; Canada 1; answer* 5; ... Wrong/Error 2; work 16;
wrtten* 1; yellow* 1; {a, 22}; {about, 10}; {and, 4}; {are, 42};
... {what, 72}; {who, 17}; {you, 49}; {your, 20}
```

Term frequency lists are maintained for each individual response (as a sum of the term list for each RQ in that response) and for the entire set of responses (as a sum of the term lists in RQs for each response) in database 30. These term frequency lists may be updated each time Boolean expressions are recomputed.

As will become apparent, the purpose of the list of terms and frequencies is to allow indexing software 29 to analyse terms used in RQs and use the analysis to construct Boolean expressions that may be used to identify a particular response. In the depicted embodiment, terms and their frequencies within RQs are used to formulate Boolean sub-expressions. Each Boolean sub-expression expressed as the union (OR) of one or more Boolean elements. Each Boolean element, in turn, is the intersection (AND) of one or more sub-expressions, expected in queries for an associated response. The various Boolean sub-expressions may further be combined to form a Boolean expression stored within database 30.

Frequently occurring common terms within the list may be removed from the list in block S518. Frequency may be assessed with reference to the frequency of the terms, and the number of RQs from which the entire information base, including all indexed responses, has been constructed. In the example embodiment, common terms that appear with a high frequency in the RQs may be removed. For example, any common term occurring with a frequency greater than (Total number of RQs used to form the information base)/24 may be removed.

In the depicted embodiment, RQs for each response are stored in table 54. As depicted in FIG. 3, each RQ as entered (RQ_ORIGINAL), and each RQ as further processed (i.e. RQ_REVISED) is stored within table 54.

Next, for each remaining term in the list of terms for each individual response, its significance in identifying that particular response that is being sought is determined. More specifically in block S520, a score for each remaining term in that response is calculated. The score indicates the significance/importance of that term in identifying that particular response. As scores are calculated for each term for each response, the same term may have different scores for different responses. For any response, the higher the score, the more likely use of that term in a query will clearly identify that response within the information base, including the new responses and previously indexed responses.

In an example embodiment, the score for each term may be calculated as follows:

$$\text{Term score} = (1000/\text{len} + \text{freq1}*250)*\text{freq2},$$

where
    len=length (in number of terms) of the shortest RQ for a particular response in which the term appears;
    freq1=frequency of the term for the response/total number of terms for the response; and
    freq2=minimum of (1, frequency of the term for the response/sqrt(frequency of the term for the entire information base)).

Using this calculation, terms appearing in short RQs are assigned a higher value (i.e. 1000/len will have a relatively high value); likewise frequently appearing terms in the collection of RQs for a particular response are assigned a higher score (i.e. freq1 will be high) Finally, terms appearing infrequently in RQs for other responses in the information base will be assigned a high value (i.e. frequency of the term for the response/sqrt(frequency of the term for the entire information base) will be high.

Once a term score has been determined, and is assigned to each remaining term in all RQs for a particular response, the terms for that particular response may be grouped into groups of terms representing terms most (or more) likely and least (or less) likely to uniquely identify queries for the particular response among all indexed responses in block S522.

In the example embodiment, terms associated with each response are grouped into four separate groups. Specifically, Group A may contain terms with scores in excess of 500; Group B may contain terms with scores between 200 and 500; Group C may contain terms having scores between 100 and 200; and Group D may contain terms with scores less than 100.

Put another way, terms in Group A are more likely to uniquely identify an RQ for the response among RQs for all responses, than terms in Group B; terms Group B are more likely to uniquely identify an RQ for the response among RQs for all indexed responses, than terms in Group C; and terms in Group C are more likely to do so than terms in Group D. A person of ordinary skill will readily appreciate that more or fewer groups could be used.

For the example response above, the calculated scores may be answer=96.9
engin*=216.7
SearchEngineX*=283.3
SearchEngineY*=312.5
search*=756.2
multiple=143.5
different=259.4
difference=231.0
return*=104.6
than=165.0
a=43.3
and=71.4
between=142.9
(IntelliResponse OR IR)=97.6
(like OR "similar to")=151.4

Now, using this analysis, Boolean elements and sub-expressions that attempt to uniquely identify a particular response among all responses within the information base in database 30 may be formed.

As noted, each Boolean element includes one or more terms that are ANDed together. A composite Boolean expression for a response takes the form of the union (OR) of the multiple Boolean elements. Each Boolean sub-expression within at least one of the Boolean elements should therefore be satisfied by a query for a response that addresses the query. At the same time, however, any query should ideally only return a single response (although this may not always be the case). Moreover, however, Boolean sub-expressions are to be formed from RQs and not from all possible queries. Consequently, constructing Boolean sub-expressions requires some compromise and heuristics.

For example, a Boolean element formed from the logical AND of all terms in a one or two word RQ is an excellent choice for a Boolean element/sub-expression. Likewise, a Boolean element formed from the logical AND of all terms in a query may similarly be an excellent choice for a Boolean sub-expression (although such a Boolean element may be unnecessarily long, as detailed below).

On the other hand, a single highly unique term found in an RQ having three, four or more terms, by itself, may not be a good candidate for a Boolean sub-expression, as actual queries (different from RQs) for multiple responses could be formulated using this unique term.

In the example embodiment, Boolean elements that are believed to uniquely identify a particular response from all responses may be constructed, as follows:

1. OR together any and all terms within 1 or 2 word representative queries in block S524:

For the above example representative queries—

BOOLEAN_ELEMENT(S) = (search*) OR ((search*) AND (engine*))

2. Boolean elements representing the combination for any term in Group A AND any term in Group B:

For the above example representative queries, the Boolean elements—

BOOLEAN_ELEMENT(S) = (search*) AND (different OR difference OR engine* OR SearchEngineX* OR SearchEngineY*)

However, if a Group A or Group B is empty, no Boolean elements corresponding to Group A AND any term in Group B are formed.

3. Boolean combination for any term in Groups B AND any term in Group C AND any term in Group D in block S528

So for the above example representative queries—

BOOLEAN_ELEMENT(S) = (different OR difference OR engine OR SearchEngineX* OR SearchEngineY*) AND (multiple OR return* OR than OR between OR (like OR "similar to")) AND (answer* OR (IntelliResponse OR IR) OR a OR and)

Again, if a Group B is empty no Boolean elements corresponding to Group B AND any term in Group C AND any term in Group D are formed.

Now, the choice of BOOLEAN_ELEMENT(S) above is somewhat arbitrary. A person of ordinary skill through experimentation may readily conclude that other BOOLEAN_ELEMENTS are equally well, or even better suited to uniquely identifying a particular response.

As detailed in the '409 patent, and further below, a quality of match is ultimately calculated each time a query satisfies a Boolean expression. The quality of match depends on the number of terms matched within a Boolean expression. As such, other Boolean elements may be added to the Boolean expression to refine the quality of match returned by any particular query.

In the example embodiment, Boolean elements for any term in Group A AND any term in Group B AND any term in Group C AND any term in Group D are formed in block S530 to be added to the Boolean Expression.

BOOLEAN_ELEMENT(S) = (search*) AND (different * OR difference OR engine* OR SearchEngineX* OR SearchEngineY*) AND (multiple OR return* OR than OR between OR (like OR "similar to")) AND (answer* OR (IntelliResponse OR IR) OR a OR and)

Of note, these BOOLEAN ELEMENT(S) are also satisfied by expressions that satisfy Boolean elements formed from terms in Group A AND Group B, as well as Boolean elements formed from terms Group B AND any term in Group C AND any term in Group D.

Once all Boolean elements (or sub-expressions) are formed, the Boolean expression for the response may be formed as the union of the Boolean elements/sub-expressions. That is, the resulting Boolean expression may be formed in S532, as:

BOOLEAN_EXPRESSION = (search*) OR ((search*) AND (engine*)) OR
(search*) AND (different OR difference OR engine* OR SearchEngineX* OR SearchEngineY*) OR
(different OR difference OR engine OR SearchEngineX* OR SearchEngineY*) AND (multiple OR return* OR than OR between OR (like OR "similar to")) AND (answer* OR (IntelliResponse OR IR) OR a OR and) OR
(search*) AND (different * OR difference OR engine* OR

```
SearchEngineX* OR SearchEngineY*) AND (multiple OR return* OR
than OR between OR (like OR "similar to")) AND (answer* OR
(IntelliResponse OR IR) OR a OR and)
```

Once the Boolean expression of block S532 has been formed, all the RQs (as entered) for the response associated with the Boolean expression may be tested against the entire information base. That is, in block S534, RQs for the new response are inputted into search software 26 to assess whether or not the RQ returns the associated and desired response. This is repeated for all RQs for the response. If any one of the RQs does not return the response, the ANDed list of terms for the RQ are merely appended and ORd with the Boolean expression formed in block S532. The Boolean expression is replaced accordingly in block S536.

So, using the above example, in the event that that the RQ "Does (IntelliResponse OR IR) return multiple answers?" fails to return the associated response, the newly formed Boolean expression may be updated to include the Boolean element;

```
BOOLEAN_ELEMENT = multiple AND (IntelliResponse OR IR) AND
(return*) AND (does OR answer*)
```

Of note, common terms (does) and (answer*) are ORed not ANDed, as neither of these terms is significant.

The resulting BOOLEAN_EXPRESSION then takes the form;

```
BOOLEAN_EXPRESSION = (search*) OR ((search*) AND (engine*))
OR
(search*) AND (different OR difference OR engine* OR SearchEngineX*
OR SearchEngineY*) OR
(different OR difference OR engine OR SearchEngineX* OR
SearchEngineY*) AND (multiple OR return* OR than OR between OR
(like OR "similar to")) AND (answer* OR (IntelliResponse OR IR) OR a
OR and) OR
(search*) AND (different* OR difference OR engine* OR
SearchEngineX* OR SearchEngineY*) AND (multiple OR return* OR
than OR between OR (like OR "similar to")) AND (answer* OR
(IntelliResponse OR IR) OR a OR and) OR
multiple AND (IntelliResponse OR IR) AND (return*) AND (does OR
answer*)
```

As is evident, the above Boolean expression includes terms corresponding to the compound expressions substituted for terms in the RQs. As such, this Boolean expression will be satisfied by each of the RQs as modified. Accordingly, this Boolean expression will also be satisfied by user queries using the variants of terms included in the modified RQs.

As will be appreciated, each response to be added to information base in database 30 may be added by Boolean expression generator 29, repeating blocks S502-S536. As blocks S502-S536 may take some time to perform, they may be repeated by an operator each time a batch of new responses is added to the information base.

After added responses have been indexed using indexing software 29, an end user at a computing device interconnected with network 10 may contact server 16 containing an index of responses and Boolean expressions satisfied by possible queries, formed as detailed above.

In response, blocks S900 and onward of HG. 9 are performed by search software 26 at server 16. Optionally, prior to the performance of blocks S900, the user's identity may be prompted or retrieved. Specifically, sufficient information used to populate or retrieve a record in table 44 may be obtained from the user. That is, the user could be prompted for a name, a persistent state object ("cookie") could be retrieved from the users computer, or the like. As will become apparent, knowledge of the users identity although advantageous, is not required.

In any event, server 16 provides a search interface, typically in the form of an HTML page to the contacting computing device 14 in block S902, The HTML page includes a search field. This search field may be populated with a desired query by the user. The interface may further provide the user with suitable instructions for entering an appropriate query.

Next, a query is received at server 16 in block S904. Optionally, particulars about the query may be logged in inquiries table 42. In response to receiving the query, search software 26 parses words within the query (QUERY) and applies Boolean expressions stored within the BOOLEAN_EXPR field of table 32 for all (or selected) responses stored in table 32. In parsing, extra spaces and punctuation in the query are preferably removed/ignored. Unlike typical search techniques, submitted queries are not used to form Boolean expressions used to search responses. Instead, stored Boolean expressions for indexed responses are applied against submitted queries.

Figure 10:
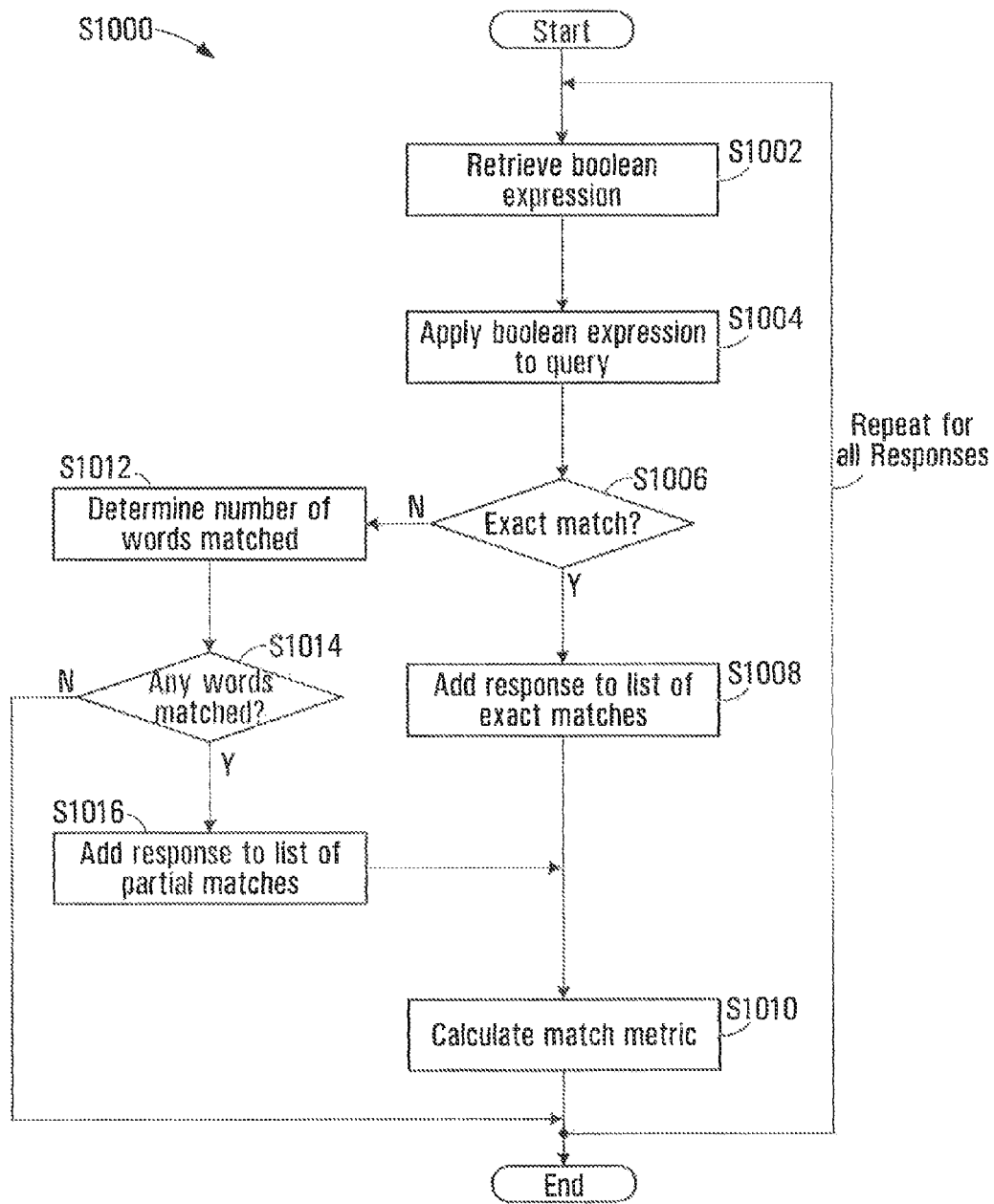

So, for each Boolean expression in table 32, blocks S1000 and onward of FIG. 10 are performed in block S906. That is, in block S1002 the Boolean expression stored in each BOOLEAN_EXPR field of table 32 is applied to the received query, and is evaluated. In the example embodiment, each term of a stored Boolean expression is separately by a Boolean operator and separately evaluated. Strings are encased with single quotes, and matched without regard to case. Logical operators AND, OR, NOT, XOR and the like may separate terms and may be interpreted. Similarly, common wild cards such as "*" "?" and the like may be used as part of the expressions.

As will be appreciated, many Boolean expressions are equivalent. As noted, Boolean expressions may be reduced to a canonical form, having multiple Boolean elements ORed together. That is, any Boolean expression is reduced to a format: (Boolean element1) OR (Boolean element2) OR (Boolean element3) OR (Boolean element4).

In this format, the Boolean expression will be satisfied if any one of the multiple sub-expressions is satisfied. Each of the ORed sub-expressions, in turn includes a single term or multiple terms that are ANDed together. In the following discussion, compound expressions substituted into RQ and incorporated into Boolean expressions are treated as single terms. For example, a sub-expression:

answer*OR(IntelliResponse OR IR)

is considered to include only two terms: answer* and the compound expression (IntelliResponse OR IR). Further, each term could, of course be a NOT term. In this way any Boolean expression may be canonically represented.

Conveniently, in this canonical format, a degree of match for each sub-expression, and for the entire Boolean expression may easily be calculated in a number of ways.

For example, as each Boolean element (i.e. Boolean element1, Boolean element1) includes only terms that are ANDed together, it is possible to calculate a degree of match for each Boolean element, as the ratio of the total number of terms in the Boolean element that are satisfied by the query, to the total number of terms of the Boolean element in the query. Thus the degree of match for any matched sub-expression would be one (1).

So for example, if Boolean element1=(A AND B AND C), a first query including words A, B and C would satisfy Boolean element1. A second query including only words A and B would not satisfy Boolean element1. A degree of match equal to ⅔ could be calculated for Boolean element1 as applied to this second query.

At the same time, in the event a sub-expression is satisfied by the query, a quality of match for that sub-expression may be calculated. Again, a quality of match may be calculated in any number of ways. For example, the quality of match may be calculated as the ratio of the number of terms in a sub-expression, divided by the total number of words in the query. So a five (5) word query including the words A, B, and C would satisfy Boolean element1 and a quality of match equal to ⅗ could be calculated.

So, in the event a Boolean expression is satisfied by the words of the submitted query, as determined in block S1006, an identifier for the response associated with the satisfied Boolean expression is maintained in block S1008. As well, one or more metrics identifying the quality of the match may be calculated in block S1010.

Numerous other ways of determining metric(s) indicative of a degree of match will be appreciated by those of ordinary skill in the art.

This metric(s) may be calculated in any number of ways. As noted the quality of match for the Boolean expression may be calculated, by calculating the quality of match for any of the matched Boolean elements of the Boolean expression, and choosing the largest of these as calculated. For the example Boolean expressions 406 (FIG. 4), question 1. "How many provinces are in Canada", would produce an exact match and a quality of match score of ⁴⁄₆, calculated as above. A question of "How many provinces in Canada are east of Saskatchewan" would yield an exact match with a quality of match word score of ⁴⁄₉. The largest of these calculated word scores may be considered the quality of match metric for the Boolean expression as applied to the particular query.

Optionally, additional metrics indicative of the quality of match may be calculated. For example, a further "relevant" word score, may be calculated by calculating a quality of match once common words stored in a common word dictionary (not specifically illustrated) are excluded. For example words like "the", "in", "an", etc. in the query may be excluded for the purposes of calculating a quality of match metric. The dictionary of common words may be manually formed depending on the responses stored within table 34. Other metrics indicative of the quality of match could be calculated in any number of ways. For example, each term in a Boolean expression could be associated with a numerical weight; proximity of matched words in the query could be taken into account. Other ways of calculating a metric indicative of a quality of match may be readily appreciated by those of ordinary skill in the art.

In the event a Boolean expression does not result in an exact match, as determined in block S1006, the number of matched words within the Boolean expression may be determined in block S1012. If at least one word is matched to a term in any sub-expression, as determined in block S1014, the response may be noted as a partially matched response in a list of partially matched responses in block S1016. A metric indicative of the degree of match may be calculated for the Boolean expression in block S1010. For example, a degree of match, as detailed above, may be calculated for each sub-expression of the Boolean expression. The largest of these may be stored as the degree of match for the query. Thus, an identifier of the partially satisfied response and the ratio of matched terms to total terms may also be stored in block S1016. Blocks S1002 and onward are repeated for each response within database 30.

Once all exactly and partially matched responses are determined in block S906 (i.e. blocks S1000), the best exact match, if any (as determined in block S1008) is determined in block S910. The best exact match may be the exact match determined in blocks S1000 having the highest metric (e.g. word count and/or relevant word count, etc.). In block S910, other exact response may be ranked. Similarly, partial matches may be ranked using the calculated degree of match metric. In block S912, the best exactly matched response is obtained from the RESPONSE field of table 32 and presented. As well, any linked responses (i.e. data in the RESPONSE field) as identified in table 36 are also presented. Preferably, the best matched exact response is unique. If it is not, all exact matches with equal degrees of match metrics may be displayed. As well as titles (or links) of stored associated and suggested responses stored in tables 34 and 36 are presented. These may, for example, be presented in a drop down box, or the like. Similarly, if server 16 indexes other types of data in table 32, (e.g. sound, images, etc.), the data associated with the best matched response may be presented in human understandable form. Preferably, not all partially matched responses will be presented. Instead only a defined number of responses or responses whose other metrics exceed defined scores need be presented. Title of these may also be presented in a drop-down box.

Results, including the highest ranked exact response, possible alternate responses, and responses associated with the highest ranked response are preferably presented to a computing device of the querying user (e.g. computing device 14) in block S912. Results may be presented as an HTML page, or the like.

In the event no exact match is found, as determined in block S908, a message as stored in NO_MATCH table 52 indicating that no exact match has been found is retrieved in block 5914. Partial matches, if any, are still sorted in block S910. A result indicating no exact match and a list of partial matches is presented in block S912.

Optionally, in the event no exact match is determined, the user may be prompted to rephrase his query or submit this query as a special query for manual processing. This may be accomplished by presenting the user with an HTML form requesting submission of the query as a special query for later handling by an operator of server 16. If the user chooses to do so, the query for which no exact match is obtained may be stored in table 52. At a later time, an operator of server 16 may analyze the query, and if desirable, add/modify RQs stored in table 54, add/modify responses and/or Boolean queries stored in tables 32 to address the special query. If a USER_ID is associated with the special query, a conventional reply e-mail addressing the special query may be sent to user.

After a single query is processed, blocks 5900 and onward may be repeated and additional queries may be processed.

Additionally, once a response has been identified, the relevance or quality of the response may be further assessed by matching the query to the contents of actual responses for which associated Boolean expression have been satisfied by the query, in manners exemplary of embodiments of the present invention.

As well, optionally for any one query, not all responses (and associated Boolean expressions) need be applied in blocks S1000. Instead, for example, only Boolean expressions for responses in a specific category or categories (as stored in the CATEGORY_ID field of a response record in table 32) need be tested. So, for example, if server 16 were used to process queries about an intranet site, categories of responses for any particular query might be limited depending on how the particular query was submitted. As a further example, in the event server 16 hosted a general site, having many topics, responses against which a particular query is tested, could be limited to a particular topic derived from the HTML page that the user is viewing when the query is initiated. Optionally, a further table may be stored in database 30 and contain a relation between categories stored in the CATEGORY_ID field of records in table 32, and categories relevant to searches originating with a particular page. That is, categories stored in tables 32 and 40 may be organized to facilitate creation of content. Accordingly, a table storing a correlation between tables 32 and 40 and categories that should be tested for any particular query may be stored.

As will be appreciated, while the organization of hardware, software and data have been explicitly illustrated, a person skilled in the art will appreciate that the invention may be embodied in a large number of ways. For example, software could be formed using any number of computer languages, components and the like. Database 30 could be replaced with an object oriented structure. Queries need not be processed over a network, but could be processed at a single, suitably adapted, machine.

Of course, the above described embodiments are intended to be illustrative only and in no way limiting. The described embodiments of carrying out the invention are susceptible to many modifications of form, arrangement of parts, details and order of operation. The invention, rather, is intended to encompass all such modification within its scope, as defined by the claims.

What is claimed:

1. A computer-implemented method of indexing a plurality of responses for later providing to users in response to queries, said method comprising:
storing said plurality of responses;
for each of said responses, storing a plurality of representative queries in association with that response, each of said representative queries representing a possible query for searching for information addressed by that response;
processing each of said representative queries to determine, for each representative query, corresponding substitute expressions for particular substitutable terms in that representative query from a plurality of substitute expressions, wherein a substitute expression is chosen for a particular one of said substitutable terms by calculating at least one first substitutability metric for that one of said substitutable terms and that substitute expression based on a measure of times that substitutable term was not substituted by that substitute expression in already processed ones of said representative queries and a measure of times that substitutable term was substituted by that substitute expression in already processed ones of said representative queries, at least one of said substitutions of that substitutable term by a substitute expression in one of said already processed ones of said representative queries having been received as input from an operator;
selectively modifying said representative queries by substituting substitutable terms of said representative queries by corresponding substitute expressions having a suitable first substitutability metric;
for each of said plurality of responses:
forming a Boolean expression from those representative queries, as selectively modified, of said plurality of representative queries associated with that response, said Boolean expression satisfied by each of those representative queries; and
storing said Boolean expression in association with that response for later applying to each of said queries, and that response to be provided to said user in response of those of said queries satisfying said Boolean expression.

2. The method of claim 1, further comprising ranking said corresponding substitute expressions for a particular one of said substitutable terms according to ones of said at least one first substitutability metric for that term.

3. The method of claim 1, further comprising:
comparing each said first substitutability metric to a first pre-defined threshold.

4. The method of claim 3, wherein at least one of said substitute expressions is chosen upon determining that said first substitutability metric for said at least one of said substitute expressions meets said first pre-defined threshold.

5. The method of claim 3, wherein one of said substitute expressions is chosen upon determining that said first substitutability metrics for said at least one of said substitute expressions meet said first pre-defined threshold and others of said substitute expressions have not already been chosen for a given term.

6. The method of claim 3, further comprising:
for at least one of said substitutable terms in a given representative query, calculating at least one second substitutability metric, each second substitutability metric measuring the appropriateness of substituting that substitutable term with a substitute expression of said plurality of substitute expressions.

7. The method of claim 6, wherein each said second substitutability metric is calculated from data describing past substitutions in other representative queries associated with responses sharing a classification with the response with which said given representative query is associated.

8. The method of claim 6, further comprising:
upon determining that said first substitutability metric for a particular substitute expression does not meet said first pre-defined threshold, comparing said second substitutability metric for that particular substitute expression to a second pre-defined threshold, wherein that particular substitute expression is chosen upon determining that said second substitutability metric for that particular substitute expression meets said second pre-defined threshold.

9. The method of claim 8, wherein said first pre-defined threshold differs from said second pre-defined threshold.

10. The method of claim 1, wherein each substitute expression of said plurality of substitute expressions includes a plurality of terms having related meaning.

11. The method of claim 1, further comprising:
determining that substituting said said particular one of said substitutable terms with a particular one of said substitute expressions is inappropriate, said determining responsive to assessing at least said first substitutability metric for said particular one of said substitute expressions.

12. The method of claim 1, further comprising:
determining that the appropriateness of substituting said said particular one of said substitutable terms with a particular one of said substitute expressions is indeterminate, said determining responsive to assessing at least said first substitutability metric for said particular one of said substitute expressions.

13. The method of claim 1, further comprising storing records of said substituting.

14. The method of claim 1, wherein said selectively modifying comprises presenting each of said corresponding substitute expressions to an operator for confirmation, and modifying each representative query in response to receiving confirmation.

15. A non-transitory computer readable storage medium storing computer executable instructions that, when executed at a computing device, cause said computing device to index a plurality of responses for later providing to users in response to queries, using a method comprising:
storing said plurality of responses;
for each of said responses, storing a plurality of representative queries in association with that response, each of said representative queries representing a possible query for searching for information addressed by that response;
processing each of said representative queries to determine, for each representative query, corresponding substitute expressions for substitutable terms in that representative query from a plurality of substitute expression, wherein a substitute expression is chosen for a particular one of said substitutable terms by calculating at least one substitutability metric for that one of said substitutable terms and that substitute expression based on a measure of times that substitutable term was not substituted by that substitute expression in already processed ones of said representative queries and a measure of times that substitutable term was substituted by that substitute expression in already processed ones of said representative queries, at least one of said substitutions of that substitutable term by a substitute expression in one of said already processed ones of said representative queries having been received as input from an operator;
selectively modifying said representative queries by substituting substitutable terms of said representative queries by corresponding substitute expressions having a suitable substitutability metric;
for each of said plurality of responses:
forming a Boolean expression from those representative queries, as selectively modified, of said plurality of representative queries associated with that response, said Boolean expression satisfied by each of those representative queries; and
storing said Boolean expression in association with that response for later applying to each of said queries, and that response to be provided to said user in response of those of said queries satisfying said Boolean expression.

16. A computing system for indexing a plurality of responses for later providing to users in response to queries, said computing system comprising:
at least one processor;
memory in communication with said at least one processor; and
software code stored in said memory, which when executed by said at least one processor causes said computing system to:
store said plurality of responses;
for each of said responses, store a plurality of representative queries in association with that response, each of said representative queries representing a possible query for searching for information addressed by that response;
processing each of said representative queries to determine, for each representative query, corresponding substitute expressions for substitutable terms in that representative query from a plurality of substitute expression, wherein a substitute expression is chosen for a particular one of said substitutable terms by calculating at least one substitutability metric for that one of said substitutable terms and that substitute expression based on a measure of times that substitutable term was not substituted by that substitute expression in already processed ones of said representative queries and a measure of times that substitutable term was substituted by that substitute expression in already processed ones of said representative queries, at least one of said substitutions of that substitutable term by a substitute expression in one of said already processed ones of said representative queries having been received as input from an operator;
selectively modifying said representative queries by substituting substitutable terms of said representative queries by corresponding substitute expressions having a suitable substitutability metric;
for each of said plurality of responses:
form a Boolean expression from those representative queries, as selectively modified, of said plurality of representative queries associated with that response, said Boolean expression satisfied by each of those representative queries; and
store said Boolean expression in association with that response for later applying to each of said queries, and that response to be provided to said user in response of those of said queries satisfying said Boolean expression.

* * * * *